(12) United States Patent
Kim et al.

(10) Patent No.: US 12,356,368 B2
(45) Date of Patent: Jul. 8, 2025

(54) METHOD AND APPARATUS FOR PERFORMING COMMUNICATION

(71) Applicant: SAMSUNG ELECTRONICS CO., LTD., Suwon-si (KR)

(72) Inventors: Hyunchul Kim, Suwon-si (KR); Yi Yang, Suwon-si (KR); Sehwan Choi, Suwon-si (KR); Sukgi Hong, Suwon-si (KR); Moonseok Kang, Suwon-si (KR); Doosuk Kang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 393 days.

(21) Appl. No.: 17/938,959

(22) Filed: Sep. 7, 2022

(65) Prior Publication Data

US 2022/0417898 A1  Dec. 29, 2022

Related U.S. Application Data

(63) Continuation of application No. PCT/KR2020/015823, filed on Nov. 11, 2020.

(30) Foreign Application Priority Data

Mar. 17, 2020 (KR) .................. 10-2020-0032874

(51) Int. Cl.
*H04W 64/00* (2009.01)
*H04W 24/10* (2009.01)
*H04W 28/04* (2009.01)

(52) U.S. Cl.
CPC ......... *H04W 64/006* (2013.01); *H04W 24/10* (2013.01); *H04W 28/04* (2013.01)

(58) Field of Classification Search
CPC ................................................. H04W 64/006
(Continued)

(56) References Cited

U.S. PATENT DOCUMENTS

2012/0124400 A1  5/2012  Yoon
2019/0137613 A1  5/2019  Yan

FOREIGN PATENT DOCUMENTS

BE        1027077 A1 *  9/2020
CN      105929365 A     9/2016
(Continued)

OTHER PUBLICATIONS

Jack Lee et al., IEEE P802.15.4z MAC. IEEE P802.15-19-0034-01-004z, Jan. 15, 2019.
(Continued)

*Primary Examiner* — Ahmad F. Matar
*Assistant Examiner* — Jirapon Tulop
(74) *Attorney, Agent, or Firm* — CANTOR COLBURN LLP

(57) ABSTRACT

An electronic device includes: at least one communication module, a memory, and a processor operably connected to the at least one communication module and the memory. The processor is configured to determine transmission offset information or contention phase information, which is associated with first communication, broadcast a first message including the transmission offset information or contention phase information by using the at least one communication module, receive at least one second message from at least one external electronic device via the at least one communication module, in response to the first message, and change the transmission offset information or contention phase information, on the basis of the at least one second message.

16 Claims, 18 Drawing Sheets

(58) Field of Classification Search
USPC .................................................... 455/456.1
See application file for complete search history.

(56) References Cited

FOREIGN PATENT DOCUMENTS

| | | |
|---|---|---|
| JP | 2009-206573 A | 9/2009 |
| KR | 10-2012-0052549 A | 5/2012 |
| KR | 10-1139536 B1 | 5/2012 |

OTHER PUBLICATIONS

Ayman Naguib, IEEE P802.15.4z MAC. IEEE P802.15-19-0123-05-004z, Mar. 14, 2019.
International Search Report mailed Feb. 18, 2021 for PCT/KR2020/015823.

* cited by examiner

FIG. 5A

| CONTENTION PHASE INFORMATION | 10 | 15 | 20 | 25 | 30 | 35 | 40 | 45 | 50 |
|---|---|---|---|---|---|---|---|---|---|
| INCREASED NUMBER OF RESPONSES | 3 | 4 | 5 | 7 | 8 | 9 | 10 | 12 | |
| DECREASED NUMBER OF RESPONSES | | 2 | 3 | 4 | 5 | 6 | 7 | 8 | 9 |

501 — CONTENTION PHASE INFORMATION
503 — INCREASED NUMBER OF RESPONSES
505 — DECREASED NUMBER OF RESPONSES
500

| 2 | 16 | 2 | 16 | 2 | 16 | 2 | 16 |
|------|---|------|---|------|---|------|---|
| 0000 | 0 | 0100 | 4 | 1000 | 8 | 1100 | C |
| 0001 | 1 | 0101 | 5 | 1001 | 9 | 1101 | D |
| 0010 | 2 | 0110 | 6 | 1010 | A | 1110 | E |
| 0011 | 3 | 0111 | 7 | 1011 | B | 1111 | F |

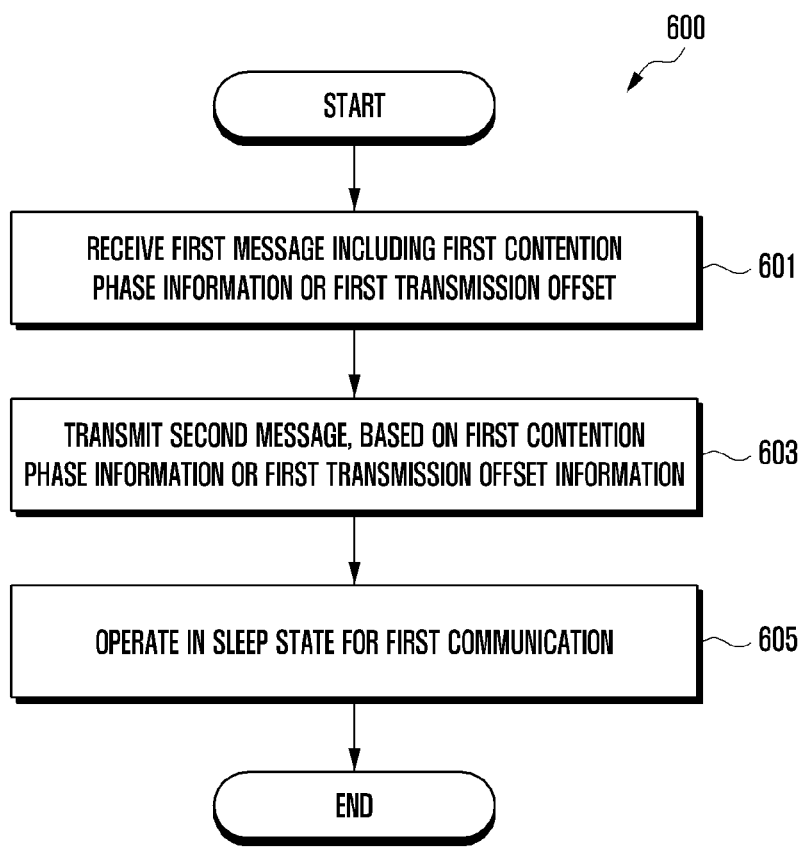

METHOD AND APPARATUS FOR PERFORMING COMMUNICATION

TECHNICAL FIELD

Various embodiments of the disclosure relate to a method and an apparatus for performing communication.

BACKGROUND ART

With the development of digital technologies, various types of electronic devices such as mobile communication terminals, personal digital assistants (PDAs), electronic organizers, smartphones, tablet personal computers (PCs), and wearable devices have become widely used. The hardware parts and/or software parts of the electronic device are continually improving in order to improve support and increase functions thereof.

Meanwhile, the electronic device measures the location of each electronic device through a two-way ranging (hereinafter, referred to as 'TWR') scheme between two electronic devices during a location (or distance) measuring operation using ultra-wide band (UWB) communication. The TWR scheme may include a single side TWR (SS-TWR) scheme or a double side TWR (DS-TWR) scheme. In the SS-TWR scheme, when the electronic device transmits a ranging poll message (or ranging poll data) to an external electronic device (or a counterpart electronic device), the external electronic device transmits a ranging response message to the electronic device and the electronic device identifies the distance from the external electronic device (or the location of the external electronic device). In the DS-TWR scheme, when an external electronic device transmits a ranging poll message to the electronic device, the electronic device transmits a ranging response message to the external electronic device and the external electronic device transmits a ranging final message to the electronic device and thus may identify the distance from the electronic device.

DISCLOSURE OF INVENTION

Technical Problem

When the UWB communication is activated, the electronic device may activate USB Rx and wait since both sides cannot accurately know time at which actual UWB ranging (for example, the operation of transmitting/receiving poll, response, or final) starts. As the time for activating the UWB Rx is longer or as the number of external electronic devices is larger, current consumption unnecessarily wasted in the electronic device may be greater. The external electronic device cannot know where the UWB response is transmitted from the electronic device or another external electronic device, and thus should activate the UWB Rx and wait, and accordingly current consumption issue may occur. The UWB communication is communication with unspecified individuals and thus is randomly performed, and collision between response messages transmitted by the external electronic device may be generated.

Solution to Problem

Various embodiments disclose a method and an apparatus capable of reducing current consumption during UWB communication for measuring the distance from an external electronic device by configuring a contention phase (or contention period) or a transmission offset for the distance measurement on the basis of a message received from the external electronic device.

An electronic device according to various embodiments includes: at least one communication module, a memory, and a processor operatively connected to the at least one communication module and the memory, where the processor is configured to determine contention phase information or transmission offset information, which is related to first communication, broadcast a first message including the contention phase information or the transmission offset information through the at least one communication module, receive at least one second message from at least one external electronic device through the at least one communication module in response to the first message, and change the contention phase information or the transmission offset information, based on the at least one second message.

An electronic device according to various embodiments may include at least one communication module, a memory, and a processor operatively connected to the at least one communication module and the memory, where the processor is configured to receive a first message including contention phase information or transmission offset information, which is related to first communication from an external electronic device through the at least one communication module and transmit a second message to the external electronic device, based on the transmission offset information within a time corresponding to the contention phase information in response to the first message.

A method of operating an electronic device according to various embodiments includes: determining contention phase information or transmission offset information, which is related to first communication; broadcasting a first message including the contention phase information or the transmission offset information through at least one communication module of the electronic device; receiving at least one second message from at least one external electronic device through the at least one communication module in response to the first message, and changing the contention phase information or the transmission offset information, based on the at least one second message.

Advantageous Effects of Invention

According to various embodiments, it is possible to reduce current consumption by dynamically controlling time of a contention phase for distance measurement according to the number of external electronic devices transmitting a response message.

According to various embodiments, it is possible to reduce the generation of collision between response messages transmitted during the contention phase by dividing a slot included in a frame into subslots and receiving a response message for distance measurement in the divided subslots.

BRIEF DESCRIPTION OF DRAWINGS

FIG. 5A illustrates an example of a contention phase table according to various embodiments.

FIG. 5C illustrates a message indication table according to various embodiments.

FIG. 6 is a flowchart illustrating a method of operating an electronic device serving as a slave according to various embodiments.

MODE FOR THE INVENTION

Figure 1:
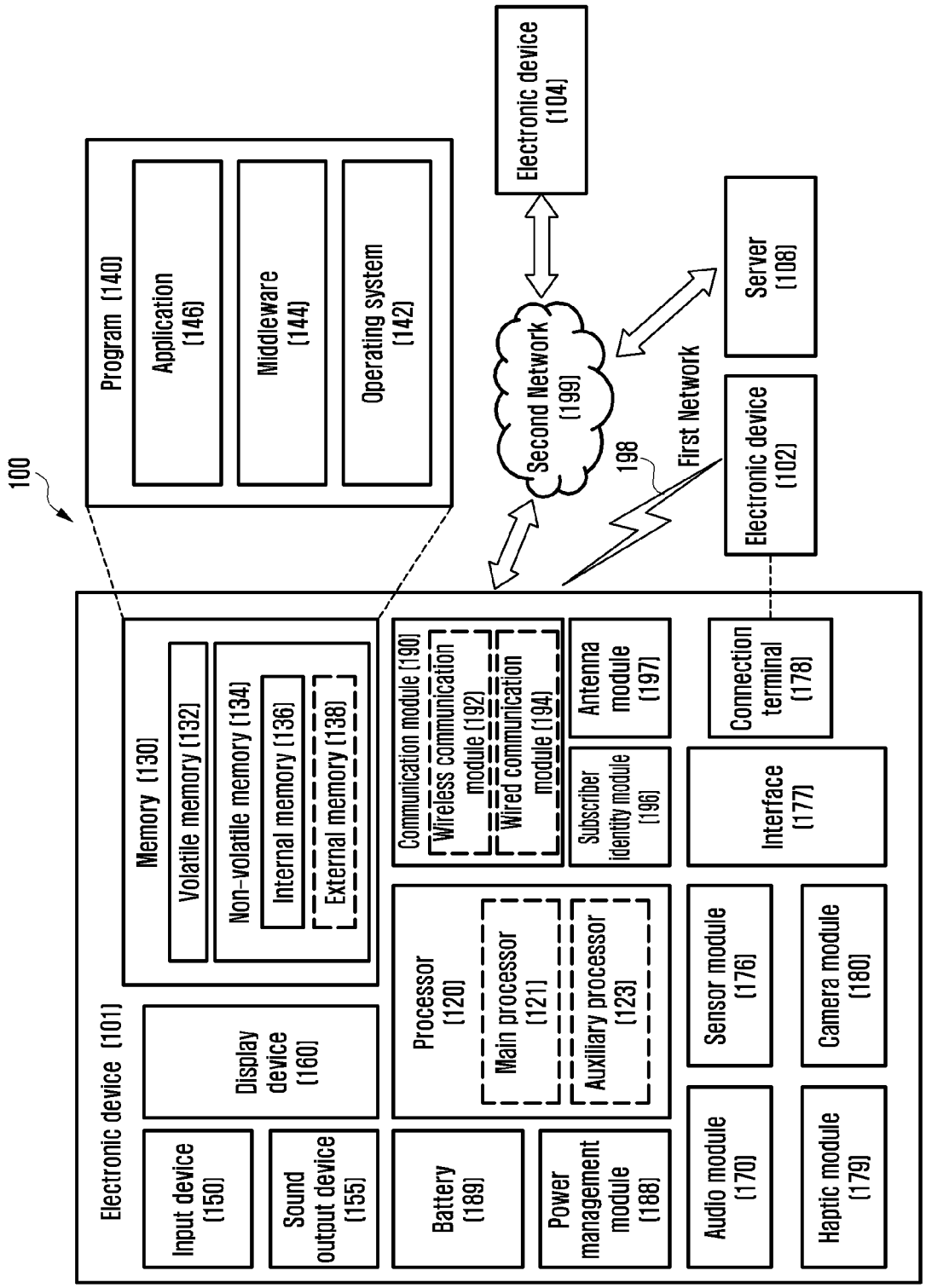
FIG. 1 is a block diagram illustrating an electronic device within a network environment according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes. The camera module 180 may be one or more modules for acquiring different signals such as RGB, IR, and time of flight (TOF), and may be a combination thereof. For example, the camera module 180 may be in the form of a stereo camera for acquiring two RGB images or may be a stereo camera in which RGB and TOF are combined.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199

(e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
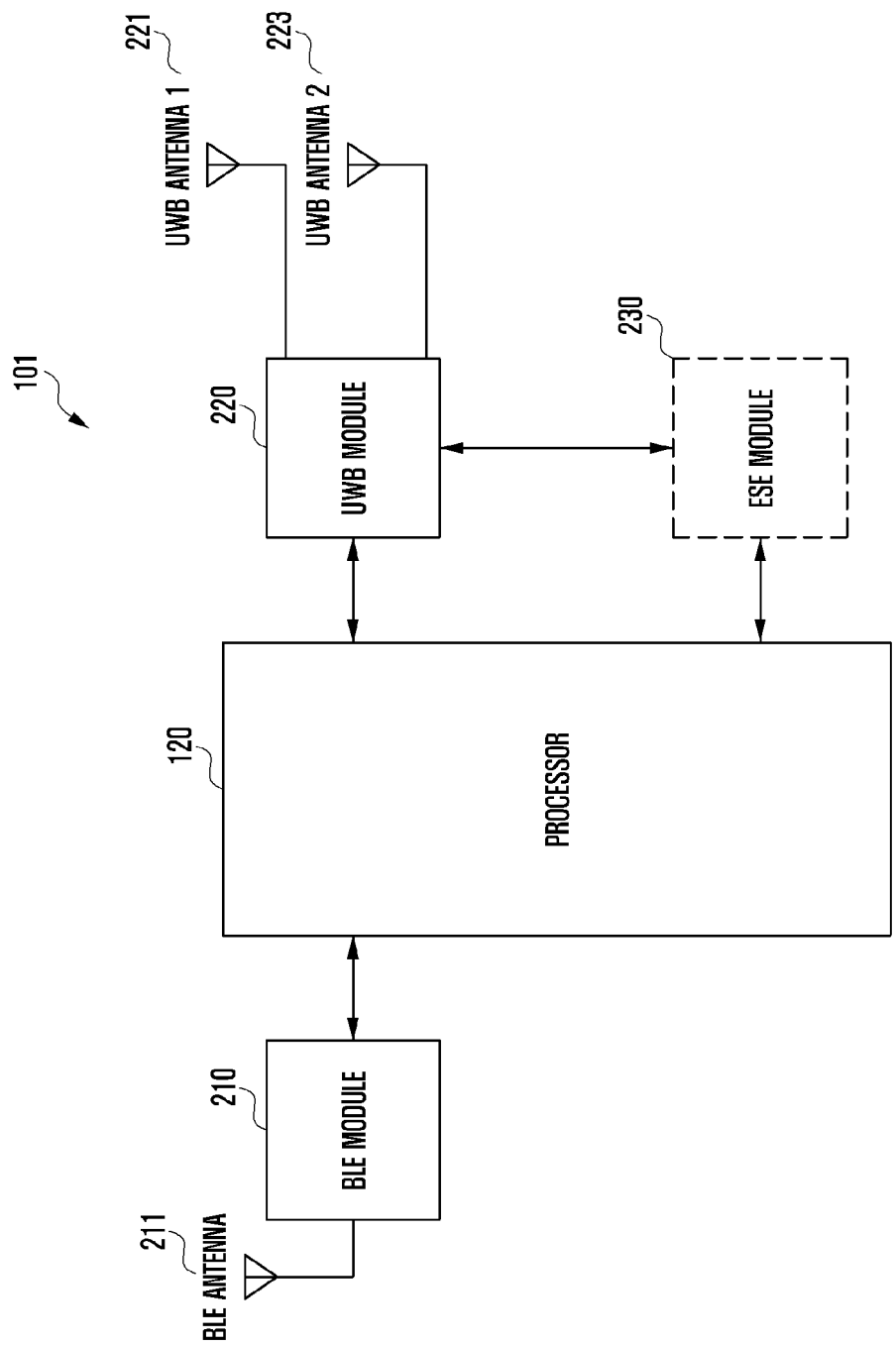
FIG. 2 is a block diagram illustrating hardware of an electronic device according to various embodiments.

FIG. 2 is a block diagram illustrating hardware of an electronic device according to various embodiments.

Referring to FIG. 2, an electronic device (for example, the electronic device 101 of FIG. 1) according to various embodiments may include the processor 120, a Bluetooth low energy (BLE) module 210, a BLE antenna 211, a UWB module 220, a first UWB antenna 221, a second UWB antenna 223, or an embedded secure element (eSE) module 230. According to various embodiments, the electronic device 101 may omit at least one (for example, the second UWB antenna 213) of the elements included in FIG. 2 or may add one or more elements. The BLE module 210, the UWB module 220, and the eSE module 230 may be operatively connected to the processor 120. The BLE module 210 or the UWB module 220 may be included in the communication module 190 of FIG. 1. The BLE module 210 may transmit and receive a BLE signal according to the control of the processor 120. The BLE module 210 may transmit and receive the BLE signal through the BLE antenna 211.

The ultra side band (UWB) module 220 may include a transmitter (Tx) module for transmitting a UWB signal (for example, poll, response, or final) and a receiver (Rx) module for receiving a UWB signal to measure the location from an external electronic device (for example, the electronic device 102 or the electronic device 104 of FIG. 1). The UWB signal may be transmitted and received through the first UWB antenna 221 or the second UWB antenna 223. The UWB module 220 may operate by the control of the processor 120 and may have a communication path (for example, a serial peripheral interface) for transmitting the received UWB signal to the processor 120 or receiving a control signal from the processor 120.

The embedded secure element (eSE) module 230 may be a module for generating or storing credential information according to circumstances. The eSE module 230 may transfer generated credential information to the UWB module 220. The eSE module 230 may be connected to the UWB module 220 through Inter-Integrated Circuit (I2C) communication. The eSE module 230 may be included in the UWB module 220 or may be located outside the UWB module 220.

Figure 3:
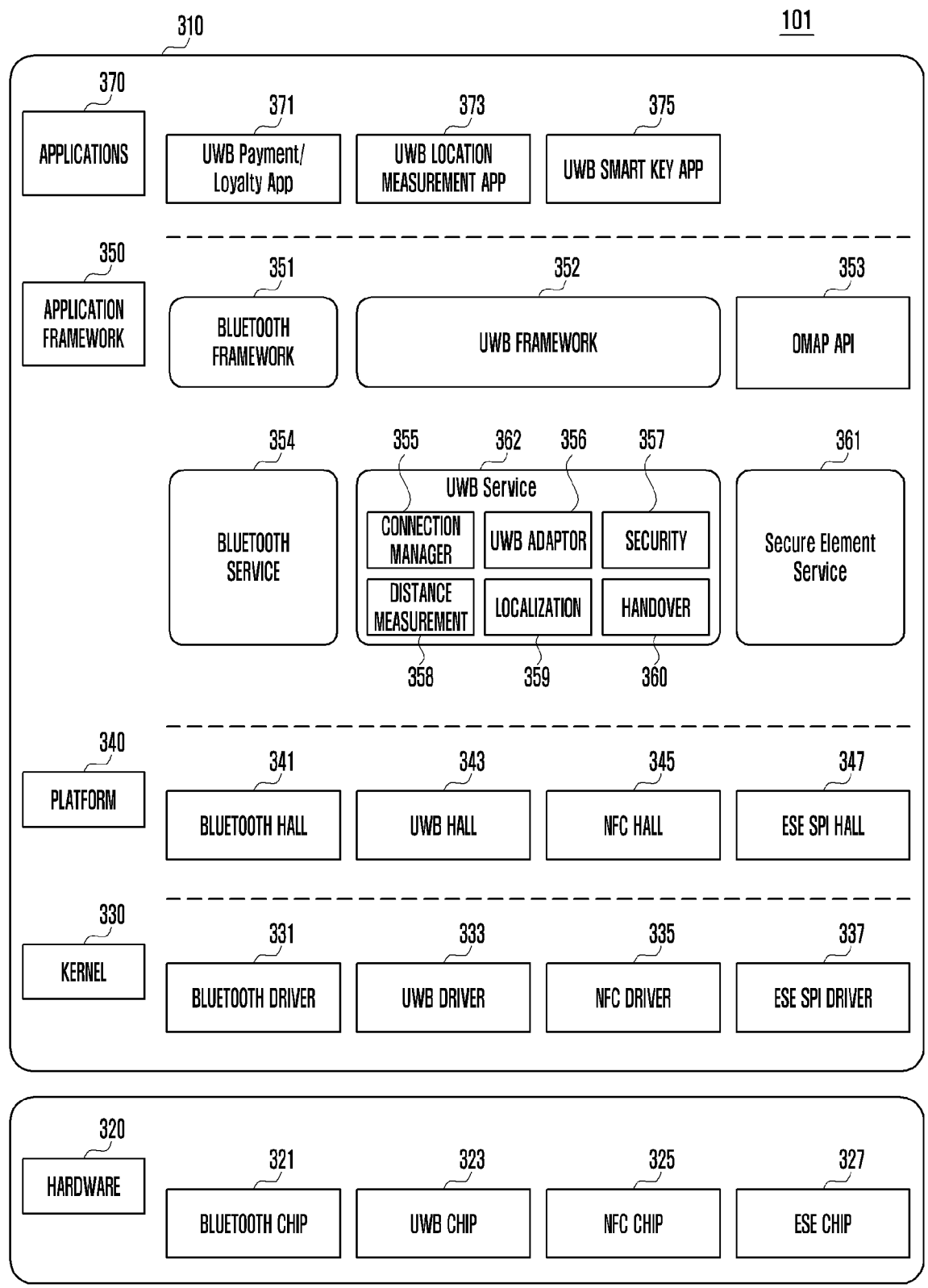
FIG. 3 is a block diagram illustrating a program module of an electronic device supporting a UWB function according to various embodiments.

FIG. 3 is a block diagram illustrating a program module of an electronic device supporting a UWB function according to various embodiments.

Referring to FIG. 3, an electronic device (for example, the electronic device 101 of FIG. 1) may include a program module 310 including an operation system (OS) that controls resources related to the electronic device 101 and/or various applications executed in the operating system, and hardware 320. The operating system may be, for example, Android, iOS, Windows, Symbian, Tizen, Bada, or the like. FIG. 3 illustrates the program module 310 and the hardware 320 that support the UWB function in the electronic device 101 of the Android operating system, for example.

The program module 310 may include a kernel 330, a platform 340, application frameworks 350, or applications 370. At least a part of the program module 310 may be preloaded on the electronic device 101, or may be downloaded from an external electronic device (for example, the electronic device 102 or 104, or the server 108). The kernel 330 may include device drivers for driving the hardware 320 (for example, a Bluetooth chip 321, a UWB chip 323, an NFC chip 325, or an eSE chip 327) of the electronic device 101. For example, the device drivers may include at least one of a Bluetooth driver 331, a UWB driver 333, an NFC driver 335, or an eSE SPI driver 337. The platform 340 may include at least one of a Bluetooth hall 341, a UWB hall 343, an NFC hall 345, or an eSE SPI hall 347 for controlling the device drivers of the kernel 330.

The application framework 350 may provide a function which the applications 370 need in common or provide various functions to the applications 370 to allow the applications 370 to efficiently use limited system resources within the electronic device 101. For example, the application frameworks 350 may include a Bluetooth framework 351, a UWB framework 352, an open multimedia applications platform (OMAP) API 353, a Bluetooth service 354, a secure element service 361, and a UWB service 362. The UWB service 362 may include a connection manager 355 for supporting a UWB-related API, a UWB adaptor 356, security 357, distance measurement 358, localization 359, or handover 360. The electronic device 101 may measure locations of a plurality of external electronic devices by using the UWB adaptor 356, the distance measurement 358, or the localization 359.

The applications 370 may include a UWB payment/loyalty application 371, a UWB location measurement application 373, and a UWB smart key application 375.

An electronic device (for example, the electronic device 101 of FIG. 1) according to various embodiments may include: at least one communication module (for example, the communication module 190 of FIG. 1), a memory (for example, the memory 130 of FIG. 1), and a processor (for example, the processor 120 of FIG. 1) operatively connected to the at least one communication module and the memory, and the processor may be configured to determine contention phase information or transmission offset information, which is related to first communication, broadcast a first message including the contention phase information or the transmission offset information through the at least one communication module, receive at least one second message from at least one external electronic device through the at least one communication module in response to the first message, and change the contention phase information or the transmission offset information, based on the at least one second message.

According to an embodiment, the first communication may be ultra-wide band (UWB) communication, and the processor is configured to measure a distance from the at least one external electronic device to the electronic device, based on the first message and the at least one second message.

According to an embodiment, the processor may be configured to change a time corresponding to the contention phase information, based on a total number of the at least one second message, and the time corresponding to the contention phase information may be configured to be shorter than a time of a cycle in which the distance is measured through the first communication.

According to an embodiment, the processor may be configured to determine reception success or reception failure by analyzing the at least one second message and calculate the total number of the at least one second message including at least one of a total number of second messages containing the reception success of the at least one second message, a total number of second messages containing the reception failure of the at least one second message, or a total number of second messages increased by the total number of second messages containing the reception failure.

According to an embodiment, the processor may be configured to, when the time corresponding to the contention phase information is increased, reflect it in a third message including the changed contention phase information or the changed transmission offset information and, when the time corresponding to the contention phase information is decreased and it is determined that the time corresponding to the contention phase information calculated for a predetermined number of times is successively decreased, the processor may be configured to reflect it in a fourth message after the predetermined number of times.

According to an embodiment, the processor may be configured to determine whether the time corresponding to the contention phase information ends and, when the time corresponding to the contention phase information ends, operate in a sleep state for the first communication.

According to an embodiment, the first communication may be deactivated in the sleep state, and the processor may be configured to determine whether a time for performing the first communication ends during the sleep state for the first communication and activate the first communication when the time for performing the first communication ends.

According to an embodiment, the transmission offset information may include at least one of a total number of transmission offsets of a next distance measurement cycle, a transmission offset number of the next distance measurement cycle, or reception offset configuration information of the next distance measurement cycle.

According to an embodiment, the processor may be configured to configure the total number of transmission offsets of the next distance measurement cycle, based on a payload of the first message.

According to an embodiment, the transmission offset number of the next distance measurement cycle may be an offset number used when the electronic device transmits a third message including the changed contention phase information or the changed transmission offset information.

According to an embodiment, the reception offset configuration information of the next distance measurement cycle may be information for configuring whether to use an offset number equal to the transmission offset number or randomly use an offset number different from the transmission offset number when the at least one external electronic device, which receives the third message, transmits a response message for the third message.

According to an embodiment, the processor may be configured to transmit a fifth message including supporting information related to the first communication through second communication different from the first communication, receive a response message including the supporting information or state information related to the first communication from at least one external electronic device, which receives the fifth message, and start the first communication when the response message corresponds to a configured condition.

According to an embodiment, the first message may further include response control information for an information request for measuring angle of arrival (AoA) information with respect to the at least one external electronic device, and the processor may be configured to calculate the AoA information with respect to the at least one external electronic device, based on additional response information included in the second message according to the response control information.

According to an embodiment, an electronic device (for example, the electronic device 101 of FIG. 1) according to various embodiments may include at least one communication module (for example, the communication module 190 of FIG. 1), a memory (for example, the memory 130 of FIG. 1), and a processor (for example, the processor 120 of FIG. 1) operatively connected to the at least one communication module and the memory, and the processor may be configured to receive a first message including contention phase information or transmission offset information related to first communication from an external electronic device through the at least one communication module and transmit a second message to the external electronic device, based on the transmission offset information within a time corresponding to the contention phase information in response to the first message.

According to an embodiment, the processor may be configured to operate in a sleep state for the first communication when the second message is transmitted.

According to an embodiment, the first communication may be deactivated in the sleep state, and the processor may be configured to determine whether a time for performing the first communication ends during the sleep state for the first communication and activate the first communication when the time for performing the first communication ends.

According to an embodiment, the processor may be configured to calculate a transmission offset number used by the external electronic device on the basis of the distance measurement cycle and the transmission offset information included in the first message and transmit a second message for the first message with the same offset number as the calculated transmission offset number.

According to an embodiment, the transmission offset information may include at least one of a total number of transmission offsets of a next distance measurement cycle, a transmission offset number of the next distance measurement cycle, or reception offset configuration information of the next distance measurement cycle, and the processor may be configured to transmit a fourth message in response to a third message received from the external electronic device with the same offset number as the transmission offset number when the reception offset configuration information of the transmission offset information is a configured value and transmit a fourth message in response to a third message received from the external electronic device with a predetermined offset number different from the transmission offset number when the reception offset configuration information of the transmission offset information is not a configured value.

According to an embodiment, the processor may be configured to insert additional response information for measuring AoA information with respect to the external electronic device on the basis of the response control information included in the first message into the second message and transmit the second message.

Figure 4:
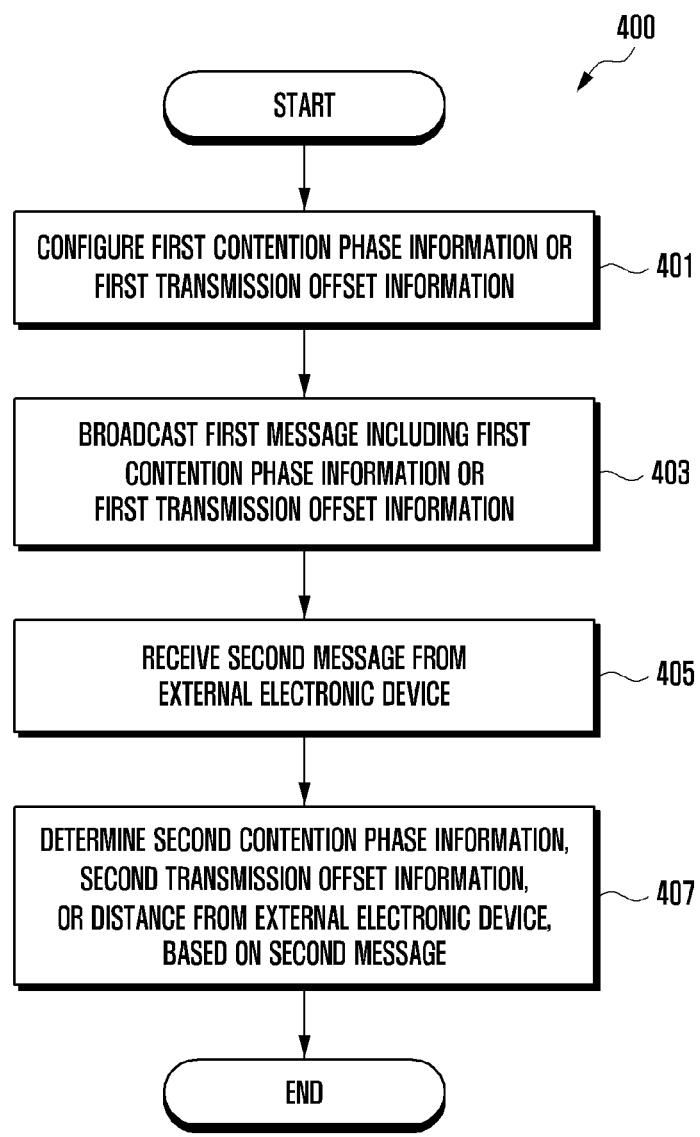
FIG. 4 is a flowchart illustrating a method of operating an electronic device serving as a master according to various embodiments.

FIG. 4 is a flowchart 400 illustrating a method of operating an electronic device serving as a master according to various embodiments.

Referring to FIG. 4, it may be described to help understanding of the disclosure that, when an electronic device (for example, the electronic device 101 of FIG. 1) according to various embodiments serves as a master (for example, an initiator or a node), an external electronic device (for example, the electronic device 102 or the electronic device 104 of FIG. 1) operates as an electronic device (for example, a responder) serving as a slave. The number of external electronic devices may be one or more, but only one external electronic device is described in FIG. 4. However, the disclosure is not limited by the description.

In operation 401, a processor (for example, the processor 120 of FIG. 1) of an electronic device (for example, the electronic device 101 of FIG. 1) may configure first contention phase information or first transmission offset information related to first communication. The first communication may be ultra-wide band (UWB) communication, and the UWB communication may measure the distance (or location) of each electronic device through a two-way ranging (hereinafter, referred to as 'TWR') scheme between electronic devices (for example, between the electronic device 101 and the electronic device 102 or the electronic device 104). The TWR scheme may include a single side TWR (SS-TWR) scheme or a double side TWR (DS-TWR) scheme. The SS-TWR scheme may be a method of measuring the distance of each electronic device through an exchange of a poll message (or poll frame) and a response message (or response frame) between electronic devices. Hereinafter, it is described that a message (for example, a first message or a second message) is transmitted or received to indicate transmission or reception of a poll message or a response message, but the message may be transmitted or received in a packet form.

In SS-TWR, the electronic device 101 may measure (or calculate) the distance to the external electronic device on the basis of difference between time at which the poll message is transmitted and time at which the response message is received from the external electronic device.

Each message (for example, the poll message or the response message) may be transmitted in one slot, and a distance measurement cycle may be configured by slots. In order to prevent collision between messages, one slot time may be defined as at least 1 millisecond (ms). When the distance measurement cycle is 100 ms, one distance measurement cycle may be configured by 100 slots (for example, slot 0 to slot 99). The above example is only to help understanding of the disclosure, and the disclosure is not limited by the description.

In UWB communication, the processor 120 of the electronic device 101 cannot know the state of the external electronic device, and thus it may be difficult to schedule which external electronic device transmits the response message and which slot is used to transmit the response message. For example, the state of the external electronic device may include at least one of the number of external electronic devices existing around the electronic device 101, whether the external electronic device supports UWB communication, whether the external electronic device can currently perform UWB communication, or a user of the external electronic device stops UWB communication. The processor 120 cannot know the state of the external electronic device and thus can measure the distance on the basis of contention. The processor 120 is required to activate (or turn on) the RX module of the UWB module (for example, the UWB module 220 of FIG. 2) during the distance measurement cycle, but if the RX module of the UWB module 220 is continuously activated, current consumption of the electronic device 101 may be great.

According to various embodiments, the processor 120 may configure time (or length) of a contention phase to be used to exchange actual messages in the distance measurement cycle on the basis of a communication state with the external electronic device. The time of the contention phase may be shorter than the distance measurement cycle. The time of the contention phase may be included in the poll message which the electronic device 101 transmits to the external electronic device. For example, the processor 120 may dynamically control the time of the contention phase according to the number of the external electronic devices. For example, when a first poll message is transmitted, the processor 120 cannot know the state of the external electronic device and thus may configure the time of the contention phase as a default value. For example, the default value of the time of the contention phase may be configured by the electronic device 101 or the user of the electronic device 101. For example, the default value of the time of the contention phase may be 10 ms (for example, slot 0 to slot 9). Such an example is only to help understanding of the disclosure but does not limit the disclosure. Since operation 401 is to transmit the first poll message related to UWB communication, the time of the contention phase may be configured as the default value.

According to various embodiments, a transmission period of the message (for example, the poll message or the response message) varies depending on an amount of information included in the message, but may be shorter than one slot time. A transmission offset may be difference between a slot start time point (for example, slot 0) and a time point (for example, slot 2) at which the actual message (for example, the poll message or the response message) is transmitted. The electronic device 101 and external electronic devices have time differences in transmission of the messages within slots, thereby reducing interference compared to the case in which transmission is always performed at the slot start time point. It is possible to reduce a probability of collision generated between the messages (for example, response messages) by dividing one slot into subslots and using the subslots rather than randomly configuring the transmission offset.

The message transmission period may be configured according to security of UWB communication included in the message (for example, the poll message or the response message), parameters related to a communication quality, or a payload length (or amount). The parameters may include preamble symbol repetitions (PSR), start of frame delimiter (SFD), scrambled timestamp sequence (STS), or data rate. The parameters may be pre-configured in the electronic device 101 or may be configured between the electronic device 101 and the external electronic device through Bluetooth low energy (BLE) before UWB communication starts. The configured parameters may not be changed while UWB communication is performed, and the maximum payload length to be used for the distance measurement cycle can be predicted by the electronic device 101.

According to various embodiments, the processor 120 may configure the number of transmission offsets on the basis of the payload length included in the message. For example, when the PSR is 64 bytes, the SFD is 8 bytes, the STS is 64 bytes, the data rate is 6.8 Mb/s, and the payload length is 30 bytes, the message transmission period may be about 190 microseconds (μs). In this case, the processor 120 may configure the number of transmission offset as five or less. This is because one slot time is 1 ms and thus one subslot time may be 200 μs when the one slot time is divided by 5 (one slot/the number of transmission offsets). Since the parameters for UWB communication are not changed, the processor 120 may configure the number of transmission offsets on the basis of the payload length included in the message.

First transmission offset information may be an offset value to be used for the next distance measurement cycle, not for the corresponding distance measurement cycle. The first transmission offset information may include at least one of the number of first transmission offsets of the next distance measurement cycle, a first transmission offset number of the next distance measurement cycle, or first reception-offset-configuration information of the next distance measurement cycle. For example, the first transmission offset number may be a transmission offset number to be used for the next distance measurement cycle by the electronic device 101, and the first reception-offset-configuration information may guide an offset number to be used for the next distance measurement cycle by the external electronic device. The distance measurement cycle (for example, interval) may be an interval at which the electronic device 101 transmits the poll message, for example, time from transmission of a first poll message to transmission of a second poll message. The corresponding distance measurement cycle may be a first distance measurement cycle included in the first poll message when the corresponding first message (for example, the first poll message) is transmitted. The next distance measurement cycle may be a second distance measurement cycle included in the second poll message when the next poll message (for example, the second poll message) is transmitted rather than the first distance measurement cycle.

The first reception-offset-configuration information may include information indicating whether the external electronic device uses the same offset number as the first transmission offset number or randomly uses another offset number in the next distance measurement cycle. For example, when the first reception-offset-configuration information (for example, a specific bit of the first transmission offset information (for example, bit 7)) is a predetermined condition (for example, '0'), the external electronic device may transmit the response message with the same offset number as the first transmission offset number in the next distance measurement cycle. When the first reception-offset-configuration information is not the predetermined condition (for example, '1'), the external electronic device may randomly use an offset number within the number of first transmission offsets in the next distance measurement cycle. When one slot is divided into subslots and the subslots are used, the number of all slots (for example, 100) included in the distance measurement cycle are increased to '100*the number of offsets' (for example, 500), and thus a probability of message collision between the same ranging area network (RAN) can be reduced.

According to various embodiments, the processor 120 may configure the first reception-offset-configuration information of the first transmission offset information included in a first poll message (for example, the first poll message) as 0 and second reception-offset-configuration information of second transmission offset information included in a second poll message as 0 or 1. The external electronic device initially receiving the poll message does not know the offset number included in the previous poll message, and thus may calculate the transmission offset number used by the electronic device 101 on the basis of the distance measurement cycle and the transmission offset information included in the first poll message. The external electronic device may transmit a first response message for the first poll message with the same offset number as the transmission offset number used by the electronic device 101 transmitting the first poll message. The external electronic device receiving the second poll message (for example, the second poll message) may configure an offset number on the basis of the first reception-offset-configuration information (for example, 0 or 1) of the first transmission offset information included in the first poll message and transmit a second response message for the second poll message with the configured offset number.

According to an embodiment, since operation 401 is to transmit the first poll message, the processor 120 may configure the first reception-offset-configuration information of the first transmission offset information as 0. Further, the processor 120 may configure the number of first transmission offsets or the first transmission offset number included in the first transmission offset information as a default value in operation 401. The default value of the number of first transmission offsets or the first transmission offset number may be configured by the electronic device 101 or the user. Alternatively, the processor 120 may configure the number of first transmission offsets as 0 and the first transmission offset number as the default value in operation 401.

In operation 403, the processor 120 may broadcast a first message including the first contention phase information or the first transmission offset information. The first message is a poll message and may be transmitted in a broadcast manner. For example, the poll message may include at least one of a protocol type, a service type, a frame (or message) type, contention phase information, a distance measurement cycle (or interval), transmission offset information, or response control information. A detailed description of the poll message is made in detail with reference to FIG. 5B. The first message is broadcasted and thus exists around the electronic device 101, and at least one external electronic device activating UWB communication may receive the first message. Although it is illustrated that operation 401 and operation 403 are separate operations in figures, operation 401 and operation 403 may be performed as one operation in another embodiment.

In operation 405, the processor 120 may receive a second message from the external electronic device. The second message is a response message for the first message transmitted by the electronic device 101 and may be transmitted to the electronic device 101 transmitting the first message in a unicast manner. For example, the response message may include at least one of a protocol type, a service type, a frame (or message) type, response time information, or additional response information. The response time information may include information on time at which the external electronic device receives the poll message and information on time at which the response message is transmitted. Alternatively, the response time information may include processing time information from reception the poll message to transmission of the response message by the external electronic device. The additional response information may include a horizontal angle or a vertical angle for calculating AOA information. A detailed information of the response message is made in detail with reference to FIG. 7.

In operation 407, the processor 120 may determine at least one of second contention phase information, second transmission offset information, or the distance to the external electronic device on the basis of the second message. After transmitting the first message, the processor 120 may activate the RX module of the UWB module 220 during the time of the first contention phase and wait for receiving a response message. When receiving the response message, the processor 120 may calculate the distance to the external electronic device or angle of arrival (AOA) information and transfer the same to the application (for example, the applications 370 of FIG. 3). The applications 370 may display a user interface including an identifier (for example, an icon) of the external electronic device on a display (for example, the display device 160 of FIG. 1) on the basis of the distance to the external electronic device or the AOA information. The processor 120 may calculate the distance to the external electronic device on the basis of the response time information included in the response message. The processor 120 may calculate the AOA information on the basis of the response time information or the additional response information included in the response message.

According to various embodiments, when the time of the first contention phase information expires (for example, 30 ms), the processor 120 may control the UWB communication to enter a sleep state until the next poll message (for example, the second poll message) is transmitted. When the time of the first contention phase information ends, the processor 120 may control the UWB communication to enter the sleep state during the remaining time of the distance measurement cycle. The remaining time of the distance measurement cycle may be time obtained by subtracting the time of the first contention phase information (for example, 30 ms) from the distance measurement cycle (for example, 100 ms). When the remaining time of the distance measurement cycle has passed, the processor 120 may transmit the second poll message and activate the UWB communication (for example, activate the RX module of the UWB module 220) in order to receive a response message for the second poll message.

According to various embodiments, when the second poll message is transmitted, the processor 120 may dynamically control the time of the contention phase according to the number of external electronic devices. The number of external electronic devices may be calculated as the number of response messages received during the time of the first contention phase information. The processor 120 may increase or decrease the time of the contention phase by a predetermined unit (for example, 3, 5, or 10) according to the number of response messages. The processor 120 may analyze the response message to determine reception success or reception failure. For example, the reception failure may include the occurrence of an error in decoding (or parsing) the response message. The processor 120 may determine that collision is generated between the response messages on the basis of the reception failure. The processor 120 may include at least one of the number of response messages containing reception success, the number of response messages containing reception failure, or the number of response messages increased by the number of response messages containing reception failure to calculate the number of response messages.

In an embodiment, for example, when the number of successfully received response messages is '2' and the number of response messages failed to be received is '1', the processor 120 may calculate the final number of response messages (for example, 4) on the basis of "the number of successfully received response messages (for example, 2)+the number of response messages failed to be received (for example, 1)+the number of response messages increased by the number of response messages failed to be received (for example, 1)". In another example, when the number of successfully received response messages is '2' and the number of response messages failed to be received is '2', the processor 120 may calculate the final number of response messages (for example, 6) on the basis of "the number of successfully received response messages (for example, 2)+the number of response message failed to be received (for example, 2)+the number of response messages increased by the number of response message failed to be received (for example, 2)".

The processor 120 may determine time of a second contention phase on the basis of the number of response messages received during the time of the first contention phase. The processor 120 may increase or decrease the time of the second contention phase on the basis of the number of response messages. The reference of increasing or decreasing the time of the contention phase may be predefined by the electronic device 101 or the user. According to various embodiments, the processor 120 may reflect the increase in the time of the second contention phase in transmission of the next poll message (for example, the second poll message). When the time of the contention phase is decreased and it is determined that the time of the contention phase determined during a predetermined number of times (for example, three times, five times, or ten times) is successively decreased, the processor 120 may reflect it in transmission of a poll message after the predetermined number of times (for example, a fourth poll message). When the time of the contention phase is decreased, the processor 120 may reduce the time of the contention phase step by step. A table of the contention phase including the time of the contention phase corresponding to the number of response messages is described in detail with reference to FIG. 5A.

According to various embodiments, when the second poll message is transmitted, the processor 120 may determine second transmission offset information on the basis of the payload length included in the response message or the second poll message. The processor 120 may determine the number of transmission offsets on the basis of the payload length included in the second poll message, configure a specific bit value of the second transmission offset information as 0 or 1, and determine a second transmission offset number. The processor 120 may determine second contention phase information (for example, the time of the second contention phase) or second transmission offset information to be included in the second poll message in operation 407.

The processor 120 may transmit a poll message (for example, the second poll message) including the second contention phase information or the second transmission offset information in operation 407 or after operation 407. The second contention phase information may be the same as or different from the first contention phase information. The second transmission offset information may be the same as or different from the first transmission offset information.

FIG. 5A illustrates an example of a contention phase table according to various embodiments.

Referring to FIG. 5A, a contention phase table 500 may include contention phase information 501 corresponding to the number of response messages (for example, the number of responses). The contention phase information 501 indicates the time of the contention phase (for example, 10 to 50 ms) and may correspond to the number of response messages increasing the time of the contention phase (for example, the number of increased responses) or the number of response messages decreasing the time of the contention phase (for example, the number of decreased responses). The number of response messages increasing the time of the contention phase and the number of response messages decreasing the time of the contention phase may be the same as or different from each other.

According to various embodiments, when the time of the contention phase is increased, the processor 120 may reflect it in transmission of the next poll message (for example, the second poll message). For example, referring to the contention phase table 500, when the number of response messages received during the time of the first contention phase (for example, 30 ms) included in the first poll message is 9, the processor 120 may determine the time of the second contention phase to be included in the second poll message as 35 ms.

According to various embodiments, when the time of the contention phase is decreased and it is determined that the time of the contention phase determined during a predetermined number of times (for example, three times) is successively decreased, the processor 120 may reflect it in transmission of a poll message after the predetermined number of times (for example, a fourth poll message). For example, referring to the contention phase table 500, the processor 120 may determine the time of the second contention phase to be included in the second poll message as 30 ms when the number of response messages received during the time of the first contention phase (for example, 30 ms) included in the first poll message is 4, determine time of a third contention phase to be included in a third poll message as 30 ms when the number of response messages received during the time of the second contention phase (for example, 30 ms) is 4, and determine time of a fourth contention phase to be included in a fourth poll message as 25 ms when the number of response messages received during the time of the third contention phase (for example, 30 ms) is 4.

In another example, referring to the contention phase table 500, the processor 120 may determine the time of the second contention phase to be included in the second poll message as 30 ms when the number of response messages received during the time of the first contention phase (for example, 30 ms) included in the first poll message is 4, determine time of a third contention phase to be included in a third poll message as 30 ms when the number of response messages received during the time of the second contention phase (for example, 30 ms) is 4, and determine time of a fourth contention phase to be included in a fourth poll message as 30 ms when the number of response messages received during the time of the third contention phase (for example, 30 ms) is 5. When the time of the contention phase is decreased and it is determined that the time of the contention phase determined during a predetermined number of times (for example, three times) is not successively decreased, the processor 120 may maintain the current state without decreasing the time of the contention phase.

According to an embodiment, when the time of the contention phase is decreased or increased, the processor 120 may decrease or increase the time of the contention phase in proportion to the number of response messages. For example, referring to the contention phase table 500, the processor 120 may determine the time of the second contention phase to be included in the second poll message as 30 ms when the number of response messages received during the time of the first contention phase (for example, 30 ms) included in the first poll message is 3, determine time of a third contention phase to be included in a third poll message as 30 ms when the number of response messages received during the time of the second contention phase (for example, 30 ms) is 3, and determine time of a fourth contention phase to be included in a fourth poll message as 15 ms when the number of response messages received during the time of the third contention phase (for example, 30 ms) is 3. In another example, referring to the contention phase table 500, when the number of response messages received during the time of the first contention phase (for example, 30 ms) included in the first poll message is 12, the processor 120 may determine the time of the second contention phase to be included in the second poll message as 45 ms.

Figure 5B:
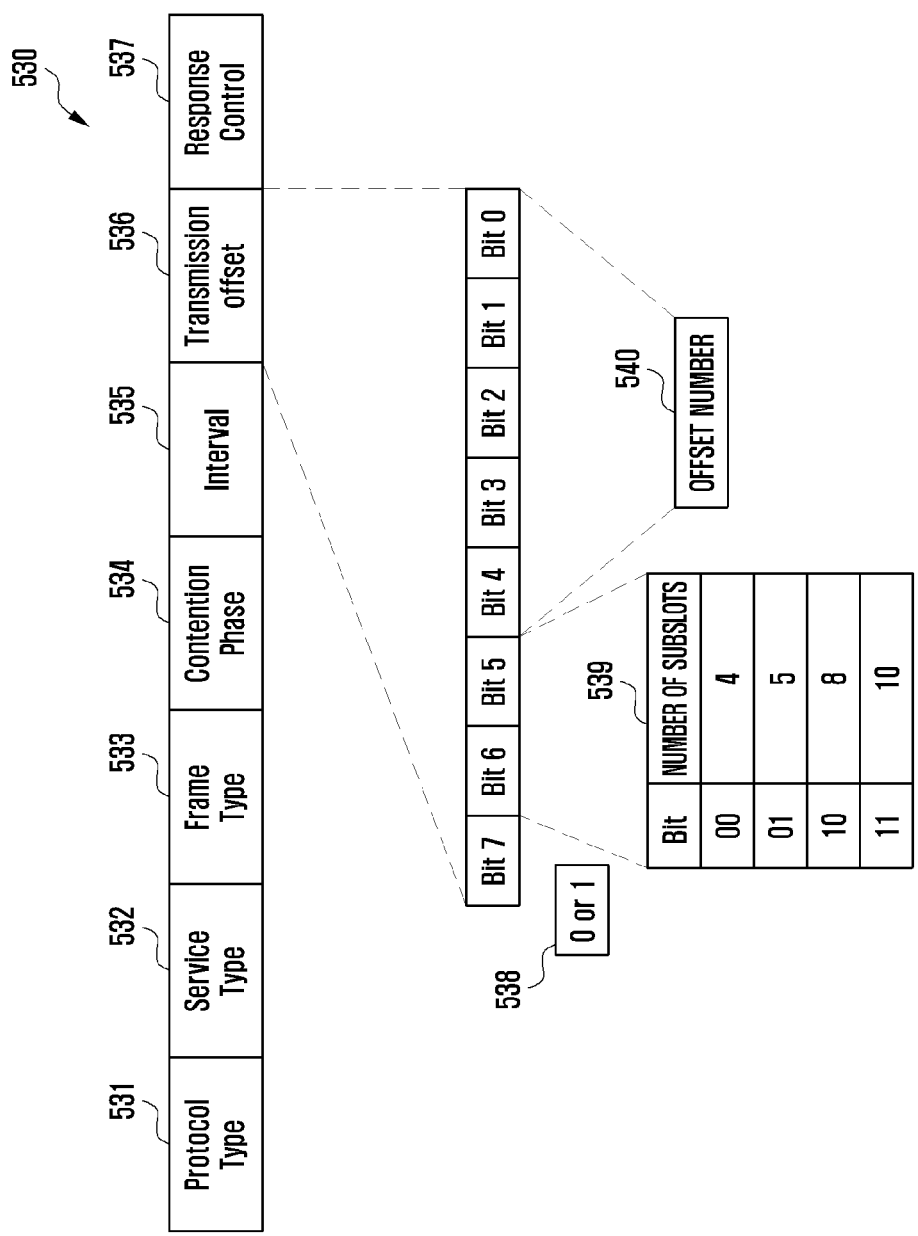
FIG. 5B illustrates a format of a poll message according to various embodiments.

FIG. 5B illustrates a format of a poll message according to various embodiments.

Referring to FIG. 5B, a poll message 530 may include at least one of a protocol type 531, a service type 532, a frame type 533, contention phase information 534, an interval 535, transmission offset information 536, or response control information 537. The poll message 530 may further include a payload. The protocol type 531 may include information on a communication protocol used for UWB communication.

The service type 532 may include information on an application executed through UWB communication. The frame type 533 indicates a format of a message and may include information indicating at least one of a poll message or a response message. The frame type 533 may indicate at least one of a poll message or a response message in the SS-TWR scheme, and the frame type 533 may indicate at least one of a poll message, a response message, or a final message in the DS-TWR scheme. The frame type 533 of the poll message 530 may indicate a poll message (for example, in the SS-TWR scheme) or a final message (for example, in the DS-TWR scheme).

According to various embodiments, the contention phase information 534 indicates the time of the contention phase and may include information on time (for example, 30 ms) to be actually used for the distance measurement cycle. The interval 535 is an interval at which the poll message is transmitted by the electronic device 101 and may be the distance measurement cycle (for example, 100 ms). For example, the interval 535 is time from transmission of a first poll message to transmission of a second poll message and may vary depending on at least one of a transmission offset number used for transmitting the first poll message, the number of transmission offsets included in the transmission offset information 536, or a transmission offset number.

According to various embodiments, the protocol type 531, the service type 532, the frame type 533, the contention phase information 534, the transmission offset information 536, or the response control information 537 may have one byte or a capacity smaller or larger than one byte. The interval 535 may have 3 bytes or a capacity smaller or larger than 3 bytes. Such an example is described only to help understanding of the disclosure and does not limit the disclosure.

The transmission offset information 536 may include at least one of the number of transmission offsets of the next distance measurement cycle, a transmission offset number of the next distance measurement cycle, or reception offset configuration information of the next distance measurement cycle. The transmission offset information 536 may be indicated by 1 byte, and the 7-bit value 538 may indicate reception offset configuration information. The reception offset configuration information of the next distance measurement cycle may include information indicating whether to equally or differently use a transmission offset number (for example, an offset number used when the electronic device 101 transmits the poll message) and a reception offset number (an offset number to be used when the external electronic device transmits the response message in the next distance measurement cycle). The 7-bit value 538 may be 0 when the transmission offset number of the reception offset number are equally used, and may be 1 when the transmission offset number of the reception offset number are differently used. Alternatively, the reverse is possible.

A 5 to 6-bit value 539 of the transmission offset information 536 may indicate the number of transmission offsets (the number of subslots) of the next distance measurement cycle. The number of transmission offsets of the next distance measurement cycle may indicate the number of subslots to be used by the external electronic device in the next distance measurement cycle. For example, the number of transmission offsets may be 4 when the 5 to 6-bit value 539 is 00, the number of transmission offsets may be 5 when the 5 to 6-bit value 539 is 01, the number of transmission offsets may be 8 when the 5 to 6-bit value 539 is 10, and the number of transmission offsets may be 10 when the 5 to 6-bit value 539 is 11. The number of transmission offsets according to the 5 to 6-bit value 539 may be generated by the electronic device 101 or the user of the electronic device 101. Such an example is described only to help understanding of the disclosure and does not limit the disclosure. A 0 to 4-bit value 540 of the transmission offset information 536 may indicate a transmission offset number of the next distance measurement cycle. The transmission offset number of the next distance measurement cycle may indicate a transmission offset number to be used by the electronic device 101 in the next distance measurement cycle.

According to various embodiments, the processor 120 may insert the transmission offset information 536 (for example, 00010) configuring the interval 535 as 100.4 ms, the 7-bit value 538 as 0, the 5 to 6-bit value 539 as 01, and the 0 to 4-bit value 540 as 3 into the poll message and transmit the poll message. In this case, the external electronic device initially receiving the poll message may calculate a transmission offset number used when the electronic device 101 transmits the poll message on the basis of the interval 535 and the 5 to 6-bit value 539 included in the transmission offset information 536. The external electronic device initially receiving the poll message may transmit a response message for the poll message with the same offset number as the calculated transmission offset number. When transmitting a response message (for example, a second response message) for the next poll message (for example, the second poll message), the external electronic device initially receiving the poll message (for example, the first poll message) may transmit the response message on the basis of the transmission offset information 536. For example, when transmitting the response message for the next poll message, the external electronic device initially receiving the poll message may transmit the response message with a third offset which is the same as the transmission offset number (for example, a third offset) within the number of transmission offsets (for example, 5).

The external electronic device which does not initially receive the poll message but has received the previous poll message may transmit the response message by using transmission offset information included in the previous poll message. When transmitting the response message for the next poll message, the external electronic device which does not initially receive the poll message but has received the previous poll message may transmit the response message with the third offset which is the same as the transmission offset number (for example, the third offset) within the number of transmission offsets (for example, 5).

Alternatively, the processor 120 may insert the transmission offset information 536 (for example, 00001) configuring the interval 535 as 100.4 ms, the 7-bit value 538 as 1, the 5 to 6-bit value 539 as 10, and the 0 to 4-bit value 540 as 2 into the poll message and transmit the poll message. In this case, the external electronic device initially receiving the poll message may calculate a transmission offset number used when the electronic device 101 transmits the poll message on the basis of the interval 535 and the 5 to 6-bit value 539 included in the transmission offset information 536. The external electronic device initially receiving the poll message may transmit the response message with the same offset number as the calculated transmission offset number. When transmitting the response message for the next poll message, the external electronic device initially receiving the poll message may transmit the response message on the basis of the transmission offset information 536. For example, when transmitting the response message for the next poll message, the external electronic device initially receiving the poll message may transmit the response message with a predetermined offset number (for example, the third offset) different from the transmission offset number (for example, the second offset) within the number of transmission offsets (for example, 5).

The external electronic device which does not initially receive the poll message but has received the previous poll message may transmit the response message by using transmission offset information included in the previous poll message. When transmitting the response message for the next poll message, the external electronic device which does not initially receive the poll message but has received the previous poll message may transmit the response message with a predetermined offset number (for example, a fourth offset) different from the transmission offset number (for example, the second offset) within the number of transmission offsets (for example, 5).

The response control information 537 may include information additionally making a request as well as information for measurement of the distance to the external electronic device (for example, response time information). For example, the response control information 537 is required to measure AOA information with the external electronic device by the electronic device 101 and may include additional information measured by the external electronic device. The response control information 537 may include at least one of horizontal angle information, vertical angle information, signal to noise ratio (SNR) peak path information, SNR first path information, information on difference between peak and first paths, index information of a first path, or reserved for future use (RFU). The horizontal angle information may include a horizontal angle (azimuth) of the electronic device 101 measured by the external electronic device or reliability (figure of merit (FoM)) for the horizontal angle measured by the external electronic device. The vertical angle information may include a vertical angle (elevation) of the electronic device 101 measured by the external electronic device or reliability for the vertical angle measured by the external electronic device. The horizontal angle or the vertical angle is always requested by the electronic device 101 and the reliability for the angle may be selectively requested. The SNR peak path information may indicate time (or index) at which a signal to noise ratio is maximum and the SNR first path information may indicate time of the first transmitted message (for example, the poll message).

The response control information 537 may expressed as 1 bytes and may include horizontal angle information sequentially from 7 bits to 0 bits, vertical angle information, signal to noise ratio (SNR) peak path information, SNR first path information, information on difference between peak and first paths, index information of the first path, or whether a request for RFU is made. A value of bits included in the response control information 537 may be configured as 1 when the information is requested, and a value of bits included in the response control information 537 may be configured as 0 when no information is requested.

FIG. 5C illustrates a message indication table according to various embodiments.

Referring to FIG. 5C, the message indication table 550 may express binary numbers as hexadecimal numbers. For example, when expressing data of 1 byte, the processor 120 may indicate 8 bits by binary numbers (for example, 0000 0000 to 1111 1111) or hexadecimal numbers (for example, 0x00 to 0xFF). Referring to the message indication table 550, the transmission offset information 536 (for example, 00010) configuring the 7-bit value 538 as 0, the 5 to 6-bit value 539 as 00, and the 0 to 4-bit value 540 as 3 may be indicated by binary numbers 0000 0010 and hexadecimal numbers 0x02. Alternatively, referring to the message indication table 550, the transmission offset information 536 (for example, 00001) configuring the 7-bit value 538 as 1 the 5 to 6-bit value 539 as 00, and the 0 to 4-bit value 540 as 2 may be indicated by binary numbers 1000 0001 and hexadecimal numbers 0x81.

FIG. 6 is a flowchart 600 illustrating a method of operating an electronic device serving as a slave according to various embodiments.

Referring to FIG. 6, it may be described that, when an electronic device (for example, the electronic device 101 of FIG. 1) according to various embodiments serves as a slave, an external electronic device (for example, the electronic device 102 or the electronic device 104 of FIG. 1) operates as an electronic device serving as a master.

In operation 601, the processor 120 of the electronic device 101 may receive a first message including first contention phase information or first transmission offset information from the external electronic device. The first message is a poll message and may include at least one of a protocol type, a service type, a frame (or message) type, contention phase information (for example, the first contention phase information), a distance measurement cycle (for example, the first distance measurement cycle or interval), transmission offset information (for example, the first transmission offset information), or response control information. The first contention phase information may be time (for example, 10 ms, 15 ms, or 30 ms) required for exchanging an actual message in the distance measurement cycle (for example, 100 ms). For example, the first transmission offset information may include at least one of the number of first transmission offsets of the next distance measurement cycle, a first transmission offset number of the next distance measurement cycle, or first reception-offset-configuration information of the next distance measurement cycle. Since the first contention phase information or the first transmission offset information have been described in detail with reference to FIG. 4, a detailed description thereof may be omitted.

In operation 603, the processor 120 may transmit a second message on the basis of the first contention phase information or the first transmission offset information. The second message is a response message, and the processor 120 may transmit the response message within the time of the first contention phase information. For example, the processor 120 may transmit the response message within the time (for example, 30 ms) corresponding to the first contention phase information during the distance measurement cycle (for example, 100 ms, the interval 535). The processor 120 may calculate a transmission offset number used when the external electronic device transmits the first message on the basis of the distance measurement cycle and the first transmission offset information included in the first message. When initially receiving the first message, the processor 120 may transmit the response message with the same offset number as the transmission offset number used when the external electronic device transmits the first message. The processor 120 may calculate the transmission offset number used when the external electronic device transmits the first message and transmit the response message for the first message with the same offset number as the calculated transmission offset number. The processor 120 may calculate the transmission offset number used when the external electronic device transmits the first message on the basis of the distance measurement cycle and the number of subslots included in the first transmission offset information.

In an embodiment, for example, when the external electronic device transmits the first message (for example, the first poll message) including the first distance measurement cycle of 100.4 ms, the number of first transmission offsets of 5, and the first transmission offset number of 2, the processor 120 may calculate one subslot time as 200 micrometers (μm) on the basis of the number of first transmission offsets. When one subslot is 0.2 ms (for example, 200 μm), the first distance measurement cycle is 100.4 ms, and the first transmission offset number is 2, the processor 120 may calculate the transmission offset number used when the external electronic device transmits the first message as 0. The distance measurement cycle may be increased or decreased by one subslot time (for example, 0.2 ms). The distance measurement cycle may be increased by one subslot time (for example, 0.2 ms) when the transmission offset number is 1, and the distance measurement cycle may be increased by two subslot time (for example, 0.4 ms) when the transmission offset number is 2. The distance measurement cycle is an interval at which the poll message is transmitted, and thus may be determined on the basis of the transmission offset number used when the external electronic device transmits the first message and the transmission offset number included in the first message. When the transmission offset number used when the external electronic device transmits the first message is 2 and the transmission offset number included in the first message is 2, the poll message with the same offset number is transmitted, and thus the distance measurement cycle may be 100 ms. When the transmission offset number used when the external electronic device transmits the first message is 2 and the transmission offset number included in the first message is 1, the distance becomes closer by 1 in one distance measurement cycle, and thus the distance measurement cycle may be 99.8 ms.

The processor 120 may insert response time information or additional response information into the response message and transmit the response message. The response time information may include information on time at which the electronic device 101 receives the poll message (for example the first message received in operation 601) from the external electronic device and information on time at which the response message (for example, the second message to be transmitted in operation 603) is transmitted. Alternatively, the response time information may include processing time information from reception of the poll message and transmission of the response message by the electronic device 101. The additional response information may include a horizontal angle of the external electronic device measured by the electronic device 101 or a vertical angle of the external electronic device measured by the electronic device 101. For example, the additional response information may be information required for calculating AOA information for the electronic device 101 by the external electronic device. According to various embodiments, the processor 120 may include reliability for the horizontal angle or reliability for the vertical angle in the response message selectively according to a request from the external electronic device transmitting the poll message.

In operation 605, the processor 120 may enter a sleep state for first communication (for example, UWB communication). According to various embodiments, when transmitting the second message, the processor 120 may enter a sleep state for UWB communication until receiving the next poll message (for example, the second poll message). The processor 120 may activate UWB communication (for example, activate the RX module of the UWB module 220) in order to receive the second poll message on the basis of the distance measurement cycle (for example, the interval 535) included in the first message. The processor 120 may repeatedly perform operations 601 to 605 during one distance measurement cycle.

According to various embodiments, the processor 120 may receive the second poll message (for example, a third message) by activating UWB communication in order to receive the second poll message. The processor 120 may transmit a response message (for example, a fourth message) for the third message on the basis of the first transmission offset information included in the first message. For example, when the first reception-offset-configuration information (for example, a specific bit value) included in the first message is 0, the processor 120 may transmit the response message for the third message by using the same number as the first transmission offset number included in the first transmission offset information. When the first reception-offset-configuration information included in the first message is 1, the processor 120 may transmit the response message for the third message by randomly using an offset number within the number of first transmission offsets of the first transmission offset information.

Figure 7:
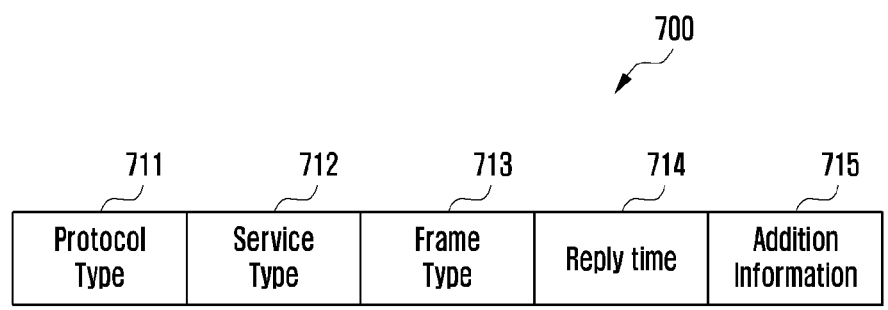
FIG. 7 illustrates a format of a response message according to various embodiments.

FIG. 7 illustrates a format of a response message according to various embodiments.

Referring to FIG. 7, a response message 700 may include at least one of a protocol type 711, a service type 712, a frame type 713, response time information (reply time) 714, or additional response information (addition information) 715. The response message 700 may further include a payload. The protocol type 711 may include information on a communication protocol used for UWB communication. The service type 712 may include information on an application executed through UWB communication. The frame type 713 indicates a format of a message and may include information indicating at least one of a poll message or a response message. The frame type 713 may indicate at least one of a poll message or a response message. The protocol type 711 or the service type 712 of the response message 700 may be the same as the protocol type 531 or the service type 532 of the poll message 530. The frame type 713 of the response message 700 may indicate the response message.

According to various embodiments, the response time information 714 may include information on time at which the electronic device 101 receives the poll message (for example, the first message received in operation 601) from the external electronic device and information on time at which the response message (for example, the second message to be transmitted in operation 603) is transmitted. Alternatively, the response time information may include information on time from reception of the poll message and transmission of the response message by the electronic device 101. The additional response information may include a horizontal angle of the external electronic device measured by the electronic device 101 or a vertical angle of the external electronic device measured by the electronic device 101.

The additional response information 715 may be information required for calculating AOA information for the electronic device 101 by the external electronic device. For example, the additional response information 715 may include at least one of a horizontal angle (azimuth), horizontal angle reliability (azimuth FoM), a vertical angle (elevation), vertical angle reliability (elevation FoM), SNR peak path information, SNR first path information, information on difference between peak and first paths, or index information of the first path. According to various embodiments, the processor 120 may include reliability for the horizontal angle or reliability for the vertical angle in the response message selectively according to a request from the external electronic device transmitting the poll message.

According to various embodiments, the protocol type 711, the service type 712, the frame type 713, or the additional response information 715 may be 1 byte or have capacity larger or smaller than 1 byte. The response time information 714 may be 4 bytes or have capacity larger or smaller than 4 bytes.

Figure 8:
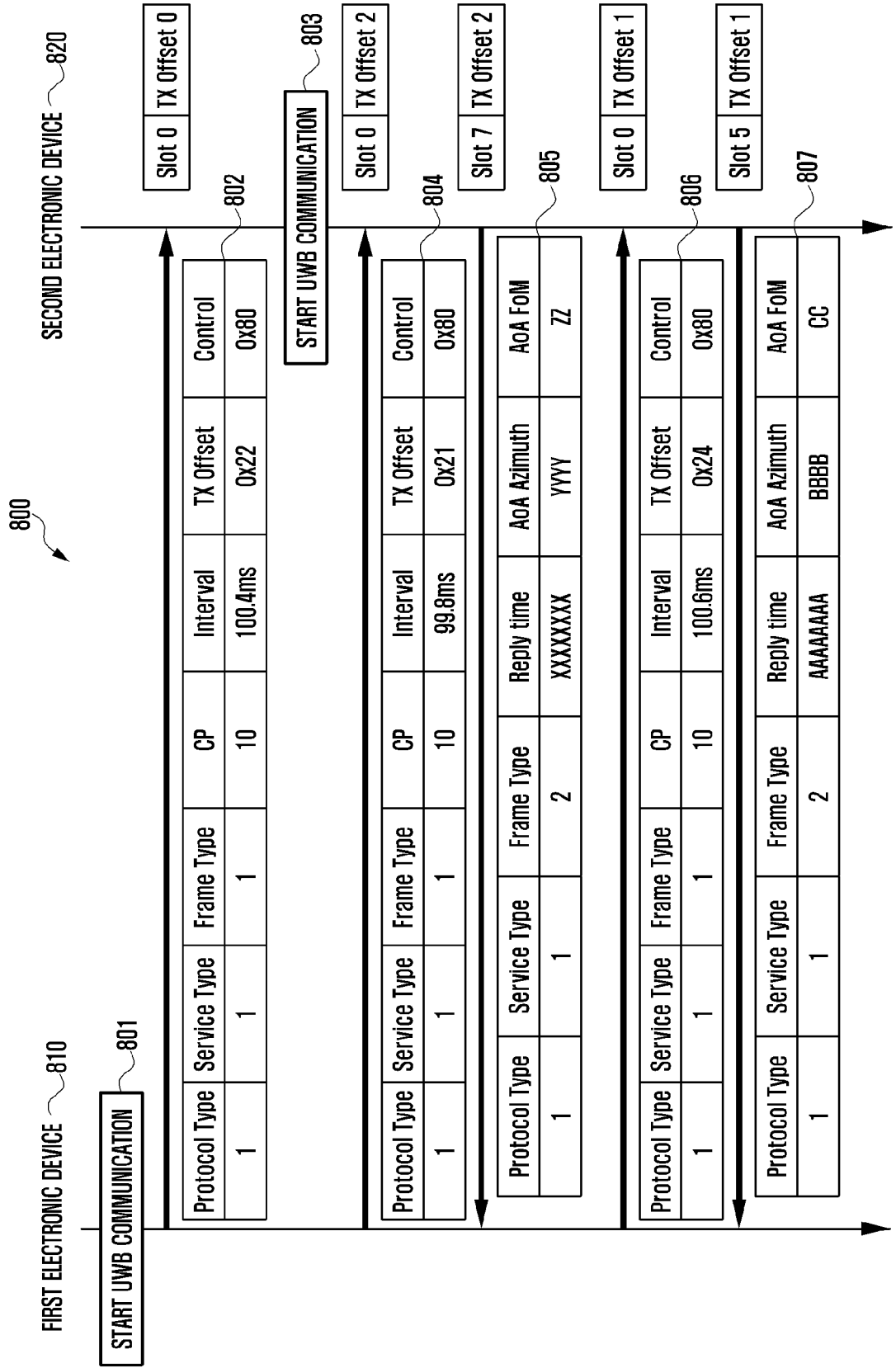
FIG. 8 is a flowchart illustrating an operation method between electronic devices according to various embodiments.

FIG. 8 is a flowchart 800 illustrating an operation method between electronic devices according to various embodiments.

Referring to FIG. 8, in operation 801, a first electronic device 810 (for example, the electronic device 101 of FIG. 1) may start UWB communication. The UWB communication may measure the distance (or location) of each electronic device through two-way ranging (hereinafter, referred to as 'TWR') between the first electronic device 810 and a second electronic device 820 (for example, the electronic device 102 of FIG. 1). The first electronic device 810 may start the UWB communication after performing a preparation process for starting the UWB communication with the second electronic device 820. The preparation process for the UWB communication is described below with reference to FIGS. 14 to 16.

In operation 802, the first electronic device 810 may broadcast a first poll message. The poll message may be transmitted to one or more electronic devices located around the first electronic device 810 in a broadcast manner. The first poll message may be a poll message first transmitted after the UWB communication starts. The first poll message may include at least one of a first protocol type (for example, 1), a first service type (for example, 1), a first frame type (for example, 1), first contention phase information (for example, 10 ms), a first distance measurement cycle (or interval) (for example, 100.4 ms), first transmission offset information (for example, 0x22), or first response control information (for example, 0x80). Operation 802 includes operation 401 and operation 403 of FIG. 4, in which the first electronic device 810 may configure the first contention phase information or the first transmission offset information and transmit the first poll message.

According to various embodiments, referring to the message indication table 550 illustrated in FIG. 5C, the first transmission offset information may be expressed by hexadecimal numbers. When the first transmission offset information is 0x22 and 7 bits to 0 bits are expressed by binary numbers, 0010 0010 may be obtained. Referring to the transmission offset information of FIG. 5B, first reception-offset-configuration information of the next distance measurement cycle (for example, a second distance measurement cycle) may be 0, a first transmission offset number of the next distance measurement cycle may be 2, and the number of first transmission offsets of the next distance measurement cycle may indicate 5. When the number of first transmission offsets is 5, one slot may be divided into 5 subslots. For example, one distance measurement cycle may include 100 slots and one slot time may be 1 ms. When one slot is divided into 5 subslots, the first distance measurement cycle may include a total of 500 subslots. Since the first contention phase information is 10 ms, the first electronic device 810 may receive a response message within 50 subslots during the first distance measurement cycle. The first poll message is a first message transmitted by the first electronic device 810, and accordingly, the first electronic device 810 may transmit a transmission offset number 0 (for example, Tx offset 0) in slot 0 (for example, a first subslot among the 50 subslots).

The first transmission offset information may be a value to be used in the next distance measurement cycle (for example, the second distance measurement cycle), not in the corresponding distance measurement cycle (for example, the first distance measurement cycle).

According to various embodiments, the first electronic device 810 may make a request for the same value or a different value to be included in the response message on the basis of the first response control information. The first electronic device 810 may need post processing to acquire more accurate distance measurement and AoA information and need additional information to perform distance measurement and calculate AoA information. However, not all the values are not needed at all times, and when all the values are always transmitted, the message length may become longer, current consumption may increase, a collision probability may increase, and reception performance may deteriorate. The first electronic device 810 may make a request for only necessary information required for calculating distance measurement and AoA information. In an embodiment, when the first response control information is 0x80, if 7 bits to 0 bits are expressed as binary numbers, 1100 0000 may be obtained. When the first response control information is 0x80, the first electronic device 810 may make a request for inserting horizontal angle information and vertical angle information into the response message for the first poll message and transmitting the response message.

In operation 803, the second electronic device 820 may start UWB communication. Since the second electronic device 820 does not start UWB communication in operation 802, the second electronic device may not receive the first poll message.

According to various embodiments, when time (for example, 10 ms) included in the first contention phase information has passed during the first distance measurement cycle (for example, 100.4 ms), the first electronic device 810 may enter a sleep state for the UWB communication. When the first distance measurement cycle has passed, the first electronic device 810 may wake up from the sleep state and activate the RX module of the UWB module 220. According to various embodiments, the first electronic device 810 may determine the distance of the electronic device transmitting the response message for the first poll message before entering the sleep state. Before entering the sleep state or after waking up from the sleep state, the first electronic device 810 may determine second contention phase information or second transmission offset information on the basis of the response message.

In operation 804, the first electronic device 810 may broadcast a second poll message. When the first distance measurement cycle has passed, the first electronic device 810 may broadcast the second poll message in the sleep state and activate the RX module of the UWB module 220 in order to receive a response message for the second poll message. For example, the first electronic device 810 may activate the RX module at a time point at which the second poll message is broadcasted. The second poll message is a poll message transmitted after the first electronic device 810 transmits the first poll message and may be a poll message secondly transmitted after UWB communication starts. The second poll message may include at least one of a second protocol type (for example, 1), a second service type (for example, 1), a second frame type (for example, 1), second contention phase information (for example, 10 ms), a second distance measurement cycle (for example, 99.8 ms), second transmission offset information (for example, 0x21), or second response control information (for example, 0x80). The second distance measurement cycle (for example, 99.8 ms) may vary depending on the number of second transmission offsets. In an embodiment, when the second transmission offset information is 0x21, if 7 bits to 0 bits are expressed by binary numbers, 0010 0001 may be obtained. Referring to transmission offset information of FIG. 5B, second reception-offset-configuration information may be 0, a second transmission offset number may be 1, and the number of second transmission offsets may indicate 5.

The first electronic device 810 may determine the second contention phase information on the basis of the response message received for the first poll message. The first electronic device 810 may calculate the number of response messages received during the time of the first contention phase (for example, the first contention phase information). The first electronic device 810 may increase or decrease the time of the contention phase by a predetermined unit (for example, 3, 5, or 10) according to the number of response messages. Since a method of controlling the time of the contention phase has been described in detail with reference to FIG. 4, it may be omitted. The first electronic device 810 may transmit a second transmission offset number 2 (for example, Tx offset 2) in slot 0 (for example, a first subslot among 50 subslots).

In operation 805, the second electronic device 820 may transmit a first response message. The first response message may be a first response message transmitted to the first electronic device 810 with respect to the second poll message. The first response message may include a first protocol type (for example, 1), a first service type (for example, 1), a first frame type (for example, 1), first response time information (for example, reply time), or first additional response information (AoA azimuth or AoAFoM). The first protocol type, the first service type, or the first frame type included in the first response message may be the same as the second protocol type (for example, 1), the second service type (for example, 1), or the second frame type (for example, 1) included in the second poll message. The response time information may include information on time at which the second electronic device 820 receives the second poll message and information on time at which the first response message is transmitted. Alternatively, the response time information may include information on processing time information from reception of the second poll message by the second electronic device 820 and transmission of the first response message. In an embodiment, the first additional response information is requested to second response control information included in the second poll message, and since the second response control information is 0x80, the second electronic device 820 may insert horizontal angle information (AoA azimuth) or reliability of the horizontal angle information (AoAFoM) into the first response message and transmit the first response message.

According to various embodiments, since the second electronic device 820 has not received the first poll message, a slot or an offset index for transmitting the first response message may be determined on the basis of the second distance measurement cycle and second transmission offset information (for example, 0x21) included in the second poll message. For example, when the second electronic device 820 receives the second poll message including the second distance measurement cycle of 99.8 ms, the number of second transmission offsets of 5, and the second transmission offset number of 1, one subslot time may be calculated as 200 μm on the basis of the number of second transmission offsets. When one subslot is 0.2 ms (for example, 200 μm), the second distance measurement cycle is 99.8 ms, and the second transmission offset number is 1, the second electronic device 820 may calculate the transmission offset number used when the first electronic device 810 transmits the second poll message as 2. The distance measurement cycle may be increased or decreased by one subslot time (for example, 0.2 ms), and when the second transmission offset number is 1, the second distance measurement cycle is 99.8 ms, and thus it may be noted that the distance measurement cycle is decreased by one subslot time (for example, 0.2 ms). The distance measurement cycle is an interval at which the poll message is transmitted, and thus may be determined on the basis of the transmission offset number used when the first electronic device 810 transmits the second poll message and the transmission offset number included in the second poll message.

When the transmission offset number used when the first electronic device 810 transmits the second poll message is 2 and the transmission offset number included in the second poll message is 1, the distance becomes closer by 1 in one distance measurement cycle, and thus the distance measurement cycle may be 99.8 ms. Accordingly, the second electronic device 820 may calculate the transmission offset number used when the first electronic device 810 transmits the second poll message as 2. The second electronic device 820 initially receives the poll message from the first electronic device 810, and accordingly the second electronic device 820 may transmit the first response message with the same offset number (for example, Tx offset 2) as the transmission offset number transmitted by the first electronic device 810. Further, the second electronic device 820 may transmit the first response message in slot 7 among 50 subslots (for example, an eighth subslot among 50 subslots).

According to various embodiments, after transmitting the first response message, the second electronic device 820 may enter the sleep state for the UWB communication until the second distance measurement cycle included in the second poll message ends.

In operation 806, the first electronic device 810 may broadcast a third poll message. The third poll message is a poll message transmitted after the second poll message is transmitted and may be a poll message thirdly transmitted after the UWB communication starts. The third poll message may include at least one of a third protocol type (for example, 1), a third service type (for example, 1), a third frame type (for example, 1), third contention phase information (for example, 10 ms), a third distance measurement cycle (for example, 100.6 ms), third transmission offset information (for example, 0x24), or third response control information (for example, 0x80). In an embodiment, when the third transmission offset information is 0x24, if 7 bits to 0 bits are expressed by binary numbers, 0010 0100 may be obtained. Referring to transmission offset information of FIG. 5B, third reception-offset-configuration information may be 0, a third transmission offset number may be 4, and the number of third transmission offsets may indicate 5.

The first electronic device 810 may determine the third contention phase information on the basis of the response message received for the second poll message. The first electronic device 810 may calculate the number of response messages received during the time of the second contention phase (for example, the second contention phase information). The first electronic device 810 may increase or decrease the time of the contention phase by a predetermined unit (for example, 3, 5, or 10) according to the number of response messages. The first electronic device 810 may transmit the third transmission offset number 1 (for example, Tx offset 1) in slot 0.

In operation 807, the second electronic device 820 may transmit a second response message. When the second distance measurement cycle has passed, the second electronic device 820 may wake up from the sleep state and activate the RX module of the UWB module 220, so as to receive the third poll message. The second response message may be a second response message transmitted to the first electronic device 810 with respect to the third poll message. Since the information included in the second response message is the same as or similar to the first response message, a detailed description thereof may be omitted. The second electronic device 820 may determine a slot or an offset number for transmitting the second response message on the basis of the second transmission offset information (for example, 0x21) included in the second poll message. Since the reception offset configuration information of the second transmission offset number is 0, the second electronic device 820 may perform transmission with the same offset number (for example, Tx offset 1) as the transmission offset number transmitted by the first electronic device 810. Further, the second electronic device 820 may transmit the second response message in slot 5 among 50 subslots (for example, a sixth subslot among 50 subslots).

Figure 9:
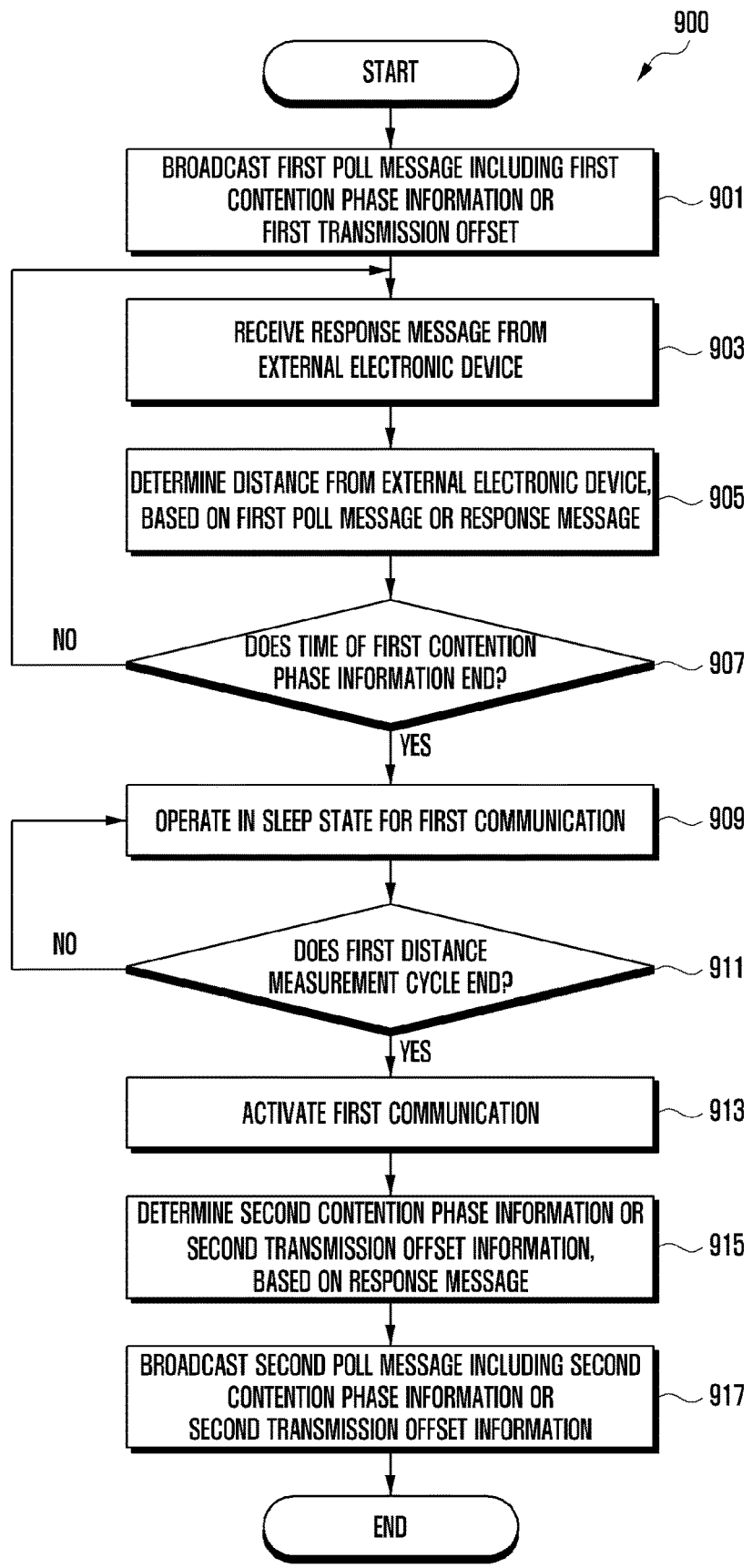
FIG. 9 is a flowchart illustrating a method of performing communication by an electronic device serving as a master according to various embodiments.

FIG. 9 is a flowchart 900 illustrating a method of performing communication by an electronic device serving as a master according to various embodiments.

Referring to FIG. 9, it may be described that, when an electronic device (for example, the electronic device 101 of FIG. 1) according to various embodiments operates as a master, an external electronic device (for example, the electronic device 102 or the electronic device 104 of FIG. 1) operates as a slave electronic device.

In operation 901, a processor (for example, the processor 120 of FIG. 1) of the electronic device 101 may broadcast a first poll message including first contention phase information or first transmission offset information related to first communication. The first poll message may include at least one of a first protocol type, a first service type, a first frame (or message) type, first contention phase information (for example, time of a first contention phase), a first distance measurement cycle (or interval), first transmission offset information, or first response control information. According to various embodiments, the processor 120 may configure time of the first contention phase to be used to exchange an actual message in the first distance measurement cycle on the basis of a communication state with the external electronic device. The time of the first contention phase may be shorter than the first distance measurement cycle.

The processor 120 may dynamically control the time of the first contention phase according to the number of external electronic devices. The first transmission offset information may include at least one of the number of first transmission offsets, a first transmission offset number, or first reception-offset-configuration information. The processor 120 may configure the number of first transmission offsets on the basis of the length of a payload included in the message. Since the detailed description of the first poll message has been made in detail with reference to FIG. 5B, it will be omitted. Operation 901 may include operation 401 and operation 403 of FIG. 4. The first poll message may exist around the electronic device 101 and at least one external electronic device activating UWB communication may receive the first poll message.

In operation 903, the processor 120 may receive a response message from at least one external electronic device. The response message may be transmitted to the electronic device 101 transmitting the first poll message in a unicast manner. The response message may include at least one of a protocol type, a service type, a frame (or message) type, response time information, or additional response information. Since the detailed description of the response message has been made in detail with reference to FIG. 7, it will be omitted. After transmitting the first poll message, the processor 120 may activate the RX module of the UWB module 220 and wait for receiving the response message during the time of the first contention phase.

In operation 905, the processor 120 may determine the distance from the external electronic device on the basis of the first poll message and/or the response message. The processor 120 may calculate the distance from the external electronic device transmitting the response message on the basis of the response time information included in the response message. The processor 120 may calculate the AOA information on the basis of the response time information or the additional response information included in the response message.

In operation 907, the processor 120 may determine the end of the time of the first contention phase information. The first contention phase information may indicate time to be used for exchanging an actual message during the first distance measurement cycle. The processor 120 may return to operation 903 when the time of the first contention phase information does not end, and may perform operation 909 when the time of the first contention phase information ends. When the time of the first contention phase information does not end, the processor 120 may receive the response message and measure the distance from the external electronic device transmitting the response message while repeatedly performing operation 903 and operation 905.

When the time of the first contention phase information ends, the processor 120 may operate in the sleep state with respect to first communication (for example, UWB communication) in operation 909. When the time of the first contention phase information ends, the processor 120 may enter the sleep state for the UWB communication during the remaining time of the distance measurement cycle. The remaining time of the first distance measurement cycle may be time obtained by subtracting the time of the first contention phase information (for example, 30 ms) from the distance measurement cycle (for example, 100 ms). The sleep state may be deactivation (or off) of the RX module of the UWB module 220. The electronic device 101 may increase current consumption due to activation of the RX module of the UWB module 220. The processor 120 may reduce current consumption by deactivating the RX module of the UWB module 220 after the time of the first contention phase information ends.

In operation 911, the processor 120 may determine whether the first distance measurement cycle ends. The processor 120 may return to operation 909 when the first distance measurement cycle does not end, and may perform operation 913 when the first distance measurement cycle ends. For example, the processor 120 may repeat operation 911 and operation 909 in order to periodically identify whether the first distance measurement cycle ends. In another example, the processor 120 may configure a timer on the basis of the first distance measurement cycle and perform operation 913 when the timer expires.

In operation 913, the processor 120 may activate first communication. When the first distance measurement cycle ends, the processor 120 may activate UWB communication (for example, activate the RX module of the UWB module 220) in order to transmit the second poll message.

In operation 915, the processor 120 may determine second contention phase information or second transmission offset information on the basis of the response message. The processor 120 may dynamically control the time of the contention phase according to the number of external electronic devices transmitting the response message. The number of external electronic devices may be calculated as the number of response messages received during the time of the first contention phase information. The processor 120 may increase or decrease the time of the contention phase by a predetermined unit (for example, 3, 5, or 10) according to the number of response messages. The processor 120 may analyze the response message to determine reception success or reception failure. For example, the reception failure may include the occurrence of an error in decoding (or parsing) the response message. The processor 120 may determine that collision is generated between the response messages on the basis of the reception failure. The processor 120 may calculate the number of response messages including at least one of the number of response messages containing reception success, the number of response messages containing reception failure, the number of response messages increased by the number of response messages containing the reception failure.

The processor 120 may determine the time of the second contention phase information on the basis of the number of response messages received during the time of the first content phase. The processor 120 may increase or decrease the time of the second content phase on the basis of the number of response messages. The reference of increasing or decreasing the time of the contention phase may be predefined by the electronic device 101 or the user. According to various embodiments, the processor 120 may differently configure a method of increasing or decreasing the time of the second contention phase information. For example, when the time of the contention phase is increased, the processor 120 may reflect it in transmission of the next poll message (for example, the second poll message). In another example, when the time of the contention phase is decreased and it is determined that the time of the contention phase determined during a predetermined number of times (for example, three times, five times, or ten times) is successively decreased, the processor 120 may reflect it in transmission of the next poll message after the predetermined number of times (for example, a fourth poll message).

The processor 120 may determine second transmission offset information on the basis of the response message or the second poll message. For example, the processor 120 may determine the number of transmission offsets on the basis of the length of a payload included in the second poll message, configure a specific bit value of the second transmission offset information as 0 or 1, and determine a second transmission offset number. Although figures illustrate that operation 915 is performed after operation 913, operation 915 may be performed at a predetermined time between operation 909 and operation 913.

In operation 917, the processor 120 may broadcast the second poll message including second contention phase information or second transmission offset information. The second contention phase information may be the same as or different from the first contention phase information. The second transmission offset information may be the same as or different from the first transmission offset information. The processor 120 may perform operation 903 to operation 911 after operation 917. According to an embodiment, the electronic device may repeat operation 901 to operation 917 at a time point at which the operation for measuring the distance from the external electronic device ends or periodically.

Figure 10:
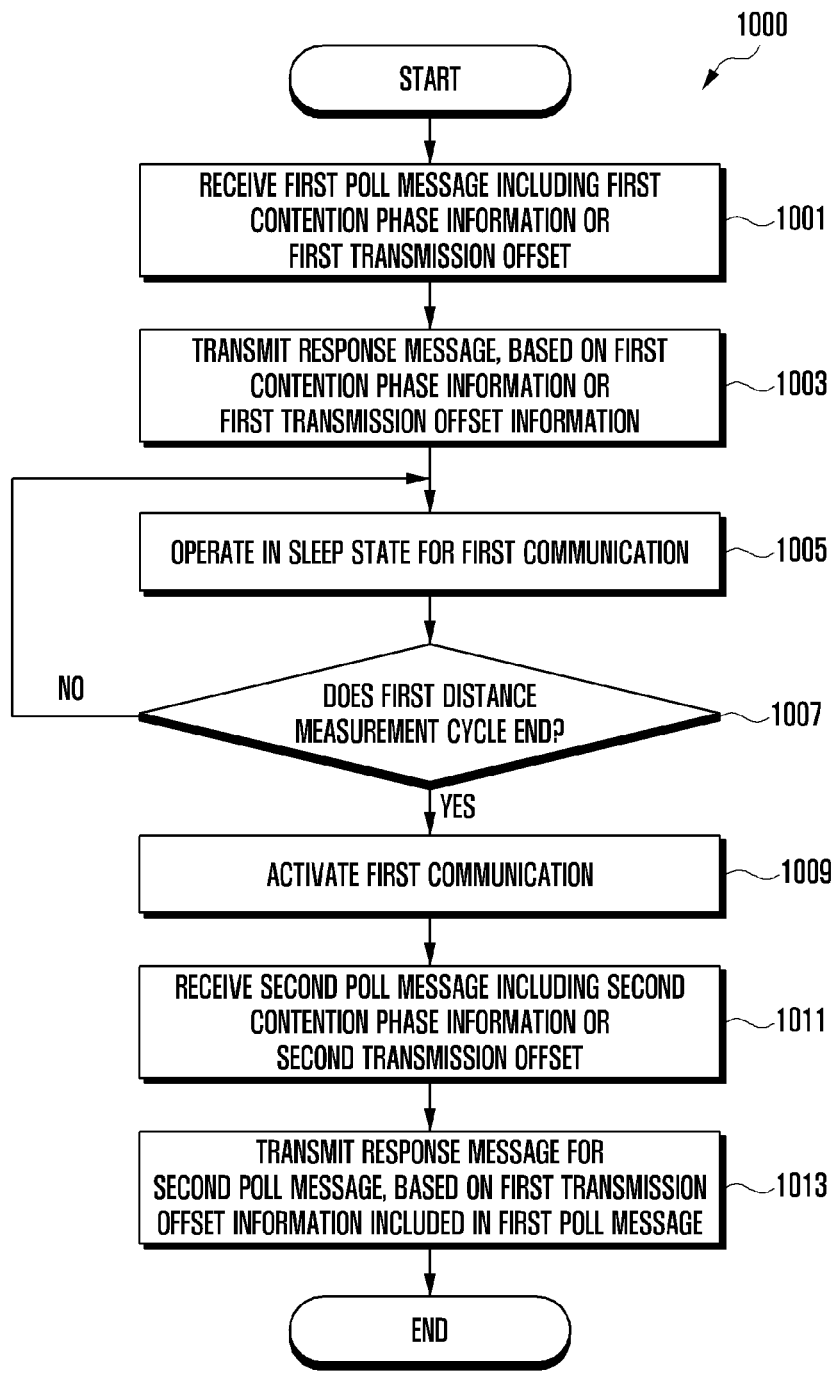
FIG. 10 is a flowchart illustrating a method of performing communication by an electronic device serving as a slave according to various embodiments.

FIG. 10 is a flowchart 1000 illustrating a method of performing communication by an electronic device serving as a slave according to various embodiments.

Referring to FIG. 10, it may be described for convenience of description that, when an electronic device (for example, the electronic device 101 of FIG. 1) according to various embodiments serves as a slave, an external electronic device (for example, the electronic device 102 or the electronic device 104 of FIG. 1) operates as a master electronic device.

In operation 1001, a processor (for example, the processor 120 of FIG. 1) of the electronic device 101 may receive a first poll message including first contention phase information or first transmission offset information related to first communication from the external electronic device. The electronic device 101 may exist around the external electronic device and receive the first poll message from the external electronic device in a state in which UWB communication is activated.

In operation 1003, the processor 120 may transmit a response message on the basis of the first contention phase information or the first transmission offset information. The processor 120 may transmit the response message within time of the first contention phase information. For example, the processor 120 may transmit the response message within the time (for example, 30 ms) corresponding to the first contention phase information during the distance measurement cycle (for example, 100 ms, the interval 535). The processor 120 may calculate a transmission offset number used when the external electronic device transmits the first poll message on the basis of a first distance measurement cycle and first transmission offset information included in the first poll message. Since the processor 120 initially receives the first message from the external electronic device in operation 1001, the processor may transmit a response message for the first poll message to the external electronic device with the same offset number as the calculated transmission offset number. When the electronic device 101 receives a second poll message from the external electronic device (for example, operation 1013), the first transmission offset information may use the first transmission offset information to transmit the response message for the second poll message to the external electronic device.

The processor 120 may insert response time information or additional response information into the response message and transmit the response message. The response time information may include information on time at which the electronic device 101 receives the first poll message from the external electronic device and information on time at which the response message is transmitted. Alternatively, the response time information may include information on time from reception of the poll message and transmission of the response message by the electronic device 101. The additional response information may include a horizontal angle of the external electronic device measured by the electronic device 101 or a vertical angle of the external electronic device measured by the electronic device 101. According to various embodiments, the processor 120 may include reliability for the horizontal angle or reliability for the vertical angle in the response message selectively according to a request from the external electronic device transmitting the poll message.

In operation 1005, the processor 120 may operate in the sleep state with respect to first communication. The sleep state may be deactivation (or off) of the RX module of the UWB module 220. The processor 120 of the electronic device 101 may reduce current consumption by deactivating the RX module of the UWB module 220 after transmitting the response message.

In operation 1007, the processor 120 may determine whether the first distance measurement cycle ends. The processor 120 may return to operation 1005 when the first distance measurement cycle does not end, and may perform operation 1009 when the first distance measurement cycle ends. For example, the processor 120 may repeat operation 1007 and operation 1005 in order to periodically identify whether the first distance measurement cycle ends. In another example, the processor 120 may configure a timer on the basis of the first distance measurement cycle and perform operation 1009 when the timer expires.

In operation 1009, the processor 120 may activate first communication. When the first distance measurement cycle ends, the processor 120 may activate the UWB communication (for example, active the RX module of the UWB module 220) in order to receive the second poll message.

In operation 1011, the processor 120 may receive the second poll message including second contention phase information or second transmission offset information.

In operation 1013, the processor 120 may transmit a response message for the second poll message on the basis of the first transmission offset information included in the first poll message received in operation 1001. For example, when first reception-offset-configuration information (for example, a specific bit value) of the first transmission offset information is 0, the processor 120 may transmit the response message for the second poll message by using the same number as the first transmission offset number included in the first transmission offset information. When the first reception-offset-configuration information is 1, the processor 120 may transmit the response message for the second poll message by randomly using an offset number within the number of first transmission offsets of the first transmission offset information.

Figure 11:
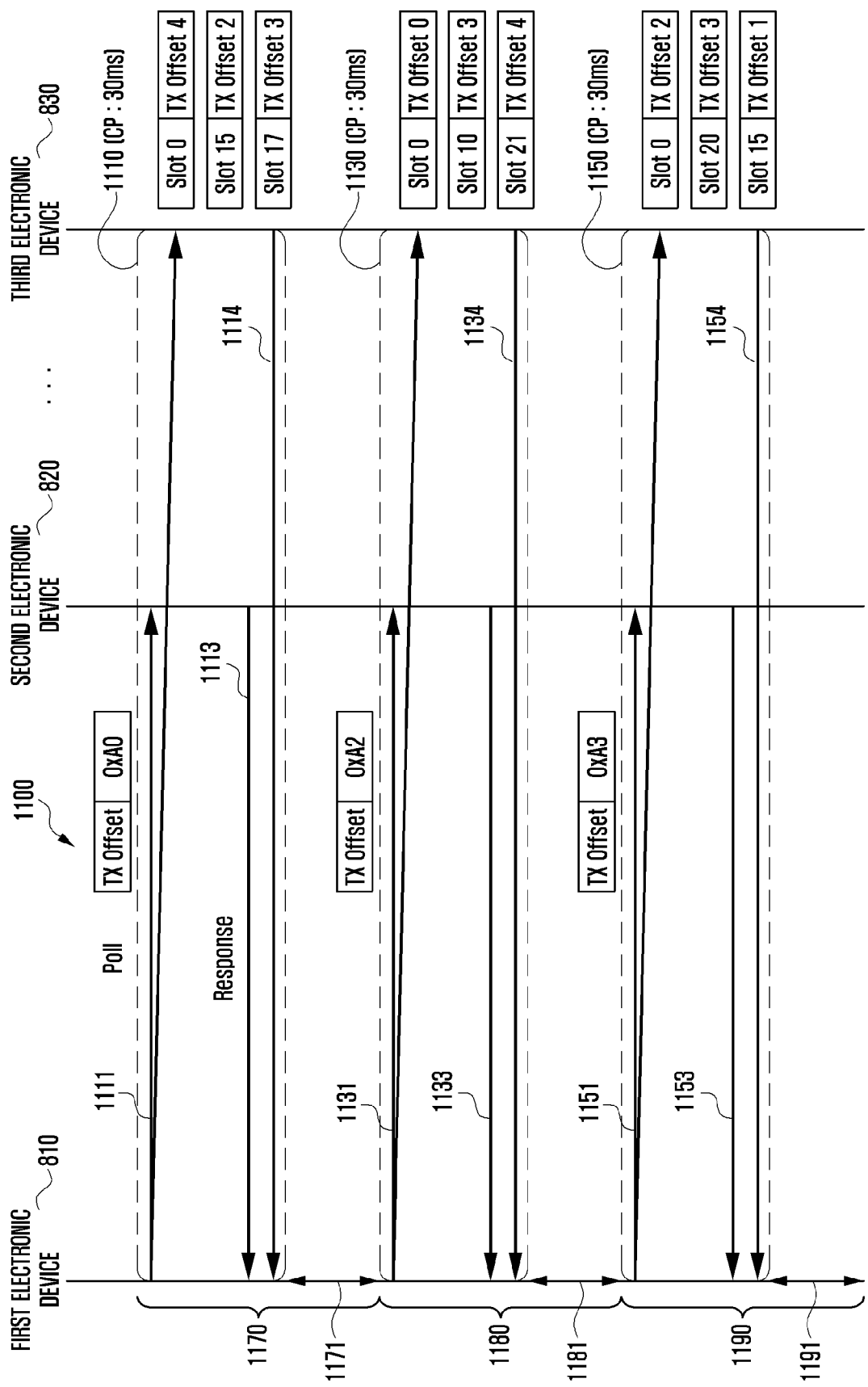
FIG. 11 is a flowchart illustrating a method of performing communication between electronic devices according to various embodiments.

FIG. 11 is a flowchart 1100 illustrating a method of performing communication between electronic devices according to various embodiments.

FIG. 11 illustrates an operation of performing UWB communication by the first electronic device 810, the second electronic device 820, and the third electronic device 830. Although FIG. 11 illustrates that the first poll message is transmitted in operation 1111 in which the first poll message is transmitted in order to help understanding of the disclosure, FIG. 11 may illustrate, as an example, the case in which the first electronic device 810 transmits the poll message to the second electronic device 820 and the third electronic device 830, and the second electronic device 820 and the third electronic device 830 transmit a response message for the poll message before operation 1111.

Referring to FIG. 11, in operation 1111, the first electronic device 810 (for example, the electronic device 101 of FIG. 1) may transmit a first poll message. The first poll message may be broadcasted to an external electronic device (for example, the electronic device 102 or the electronic device 104 of FIG. 1) around the first electronic device 810. For example, the second electronic device 820 and the third electronic device 830 around the first electronic device 810 may receive the first poll message. Operation 1111 may mean transmission of the first poll message at the same time, and the time (or time points) at which the second electronic device 820 or the third electronic device 830 receive the first poll message may be different according to the distance apart from the electronic device 810. For example, the time at which the second electronic device 820 receives the first poll message and the time at which the third electronic device 830 receives the first poll message may be different.

The first poll message may include at least one of a first protocol type, a first service type, a first frame type, first contention phase information 1110 (for example, 30 ms), a first distance measurement cycle 1170, first transmission offset information (for example, 0xA0), or first response control information. According to various embodiments, referring to the message indication table 550 illustrated in FIG. 5C, the first transmission offset information may be expressed by hexadecimal numbers. In an embodiment, when the first transmission offset information is 0xA0, if 7 bits to 0 bits are expressed by binary numbers, 1010 0000 may be obtained. Referring to transmission offset information of FIG. 5B, first reception-offset-configuration information may be 1, a first transmission offset number may be 0, and the number of third transmission offsets may indicate 5. The first poll message is a first message transmitted by the first electronic device 810, and accordingly, the first electronic device 810 may perform transmission with a transmission offset number 4 (for example, Tx offset 4) included in the poll message transmitted before the first poll message in slot 0 (for example, a first subslot among the 50 subslots) (for example, slot 0).

In operation 1113, the second electronic device 820 may transmit a first response message. The second electronic device 820 may transmit the first response message on the basis of first contention phase information included in the first poll message or transmission offset information received before the first poll message. According to various embodiments, the second electronic device 820 may determine a slot or an offset number for transmitting the first response message on the basis of the transmission offset information received before the first poll message. The second electronic device 820 may perform transmission with a first offset number (for example, Tx offset 2) in slot 15 (for example, a sixteenth subslot among 50 subslots) during the time of the first contention phase information (for example, 50 slots) on the basis of transmission offset information received before the first poll message. After transmitting the first response message, the second electronic device 820 may enter the sleep state for the UWB communication until the first distance measurement cycle 1170 included in the first poll message ends. When the first distance measurement cycle 1170 ends, the second electronic device 820 may activate the UWB communication in order to receive a second poll message.

In operation 1114, the third electronic device 830 may transmit the first response message. The third electronic device 830 may transmit the first response message on the basis of first contention phase information included in the first poll message or transmission offset information received before the first poll message. According to various embodiments, the third electronic device 830 may determine a slot or an offset number for transmitting the first response message on the basis of the transmission offset information received before the first poll message. The third electronic device 830 may perform transmission with a first offset number (for example, Tx offset 3) in slot 17 (for example, an eighteenth subslot among 50 subslots) during the time of the first contention phase information (for example, 50 slots) on the basis of transmission offset information received before the first poll message. After transmitting the first response message, the third electronic device 830 may enter the sleep state for the UWB communication until the first distance measurement cycle 1170 included in the first poll message ends. When the first distance measurement cycle 1170 ends, the third electronic device 830 may activate the UWB communication in order to receive a second poll message.

According to various embodiments, when the time of the first contention phase information 1110 ends after the first poll message is transmitted, the first electronic device 810 may enter the sleep mode for the UWB communication during the remaining time 1171 of the first distance measurement cycle 1170. The first electronic device 810 may measure the distance from the external electronic device transmitting the response message and calculate AOA information on the basis of the response message received during the time of the first contention phase information 1110. When the remaining time 1171 of the first distance measurement cycle 1170 ends, the first electronic device 810 may activate UWB communication and transmit the second poll message. According to an embodiment, before entering the sleep mode or after activating the UWB communication, the first electronic device 810 may determine second contention phase information or second transmission offset information on the basis of the response message. The processor 120 may dynamically control the time of the contention phase according to the number of external electronic devices transmitting the response message. The first electronic device 810 may determine second transmission offset information on the basis of the response message or the second poll message. For example, the processor 120 may determine the number of transmission offsets on the basis of the length of a payload included in the second poll message, configure a specific bit value of the second transmission offset information as 0 or 1, and determine a second transmission offset number.

In operation 1131, the first electronic device 810 (for example, the electronic device 101 of FIG. 1) may transmit the second poll message. For example, the second electronic device 820 and the third electronic device 830 may receive the second poll message. The time at which the second electronic device 820 or the third electronic device 830 receives the second poll message may vary depending on the distance between the second electronic device 820 or the third electronic device 830 and the electronic device 810.

The second poll message may include at least one of a second protocol type, a second service type, a second frame type, second contention phase information 1130 (for example, 30 ms, a second distance measurement cycle 1180, first transmission offset information (for example, 0xA2), or second response control information. According to various embodiments, when the second transmission offset information is 0xA2, if 7 bits to 0 bits are expressed by binary numbers, 1010 0010 may be obtained. Referring to transmission offset information of FIG. 5B, second reception-offset-configuration information may be 1, a second transmission offset number may be 2, and the number of second transmission offsets may indicate 5. The second poll message is a second message transmitted by the first electronic device 810 during the second distance measurement cycle 1180, and accordingly, the first electronic device 810 may perform transmission with a first transmission offset number 0 (for example, Tx offset 0) included in the first poll message in slot 0 (for example, a first subslot among the 50 subslots) (for example, slot 0).

In operation 1133, the second electronic device 820 may transmit a second response message. The second electronic device 820 may transmit the second response message on the basis of second contention phase information included in the second poll message or first transmission offset information included in the first poll message. According to various embodiments, the second electronic device 820 may determine a slot or an offset number for transmitting the second response message on the basis of the first transmission offset information (for example, 0xA0) included in the first poll message. The second electronic device 820 may perform transmission with a first offset number (for example, Tx offset 3) in slot 10 (for example, an eleventh subslot among 50 subslots) (for example, slot 10) during the time of the second contention phase information (for example, 50 slots) since reception offset configuration information of the first transmission offset number is 1. Since the reception offset configuration information is 1, the second electronic device 820 may perform transmission with an offset number different from the first electronic device 810. After transmitting the second response message, the second electronic device 820 may enter the sleep state for the UWB communication until the second distance measurement cycle 1180 included in the second poll message ends. When the second distance measurement cycle 1180 ends, the second electronic device 820 may activate the UWB communication in order to receive a third poll message.

In operation 1134, the third electronic device 830 may transmit the second response message. The third electronic device 830 may transmit the second response message on the basis of second contention phase information included in the second poll message or first transmission offset information included in the first poll message. According to various embodiments, the third electronic device 830 may determine a slot or an offset number for transmitting the second response message on the basis of the first transmission offset information (for example, 0xA0) included in the first poll message. The third electronic device 830 may perform transmission with a first offset number (for example, Tx offset 4) in slot 21 (for example, a $22^{nd}$ subslot among 50 subslots) during the time of the second contention phase information (for example, 50 slots) since reception offset configuration information of the first transmission offset number is 1. Since the reception offset configuration information is 1, the third electronic device 830 may perform transmission with an offset number different from the first electronic device 810. After transmitting the second response message, the third electronic device 830 may enter the sleep state for the UWB communication until the second distance measurement cycle 1180 included in the second poll message ends. When the second distance measurement cycle 1180 ends, the third electronic device 830 may activate the UWB communication in order to receive the second poll message.

According to various embodiments, when the time of the second contention phase information 1130 ends after the second poll message is transmitted, the first electronic device 810 may enter the sleep mode for the UWB communication during the remaining time 1181 of the second distance measurement cycle 1180. The first electronic device 810 may measure the distance from the external electronic device and calculate AOA information on the basis of the response message received during the time of the second contention phase information 1130. When the remaining time 1181 of the second distance measurement cycle 1180 ends, the first electronic device 810 may activate UWB communication and transmit a third poll message. Before entering the sleep mode or after activating the UWB communication, the first electronic device 810 may determine third contention phase information or third transmission offset information on the basis of the response message.

In operation 1151, the first electronic device 810 (for example, the electronic device 101 of FIG. 1) may transmit the third poll message. For example, the second electronic device 820 may receive the third poll message, and the third electronic device 830 may receive the third poll message. Operation 1151 may mean transmission of the third poll message at the same time, and the reception time of the second electronic device 820 or the third electronic device 830 may be different according to the distance apart from the electronic device 810.

The third poll message may include at least one of a third protocol type, a third service type, a third frame type, third contention phase information 1150 (for example, 30 ms, a third distance measurement cycle 1190, third transmission offset information (for example, 0xA3), or third response control information. According to various embodiments, when the third transmission offset information is 0xA3, if 7 bits to 0 bits are expressed by binary numbers, 1010 0011 may be obtained. Referring to transmission offset information of FIG. 5B, third reception-offset-configuration information may be 1, a third transmission offset number may be 3, and the number of third transmission offsets may indicate 5. The third poll message is a message transmitted by the first electronic device 810 during a third distance measurement cycle 1190, and accordingly, the first electronic device 810 may perform transmission with a second transmission offset number 2 (for example, Tx offset 2) included in the second poll message in slot 0 (for example, a first subslot among the 50 subslots) (for example, slot 0).

In operation 1153, the second electronic device 820 may transmit a third response message. The second electronic device 820 may transmit the third response message on the basis of third contention phase information included in the third poll message or second transmission offset information included in the third poll message. According to various embodiments, the second electronic device 820 may determine a slot or an offset number of transmitting the third response message on the basis of second transmission offset information (for example, 0xA2) included in the second poll message. The second electronic device 820 may perform transmission with a first offset number (for example, Tx offset 3) in slot 20 (for example, a $21^{st}$ subslot among 50 subslots) (for example, slot 20) during the time of the third contention phase information (for example, 50 slots) since reception offset configuration information of the second transmission offset number is 1. Since the reception offset configuration information is 1, the second electronic device 820 may perform transmission with an offset number different from the first electronic device 810. After transmitting the third response message, the second electronic device 820 may enter the sleep state for the UWB communication until the third distance measurement cycle 1190 included in the third poll message ends. When the third distance measurement cycle 1190 ends, the second electronic device 820 may activate the UWB communication in order to receive a fourth poll message.

In operation 1154, the third electronic device 830 may transmit the third response message. The third electronic device 830 may transmit the third response message on the basis of third contention phase information included in the third poll message or second transmission offset information included in the second poll message. According to various embodiments, the third electronic device 830 may determine a slot or an offset number of transmitting the third response message on the basis of second transmission offset information (for example, 0xA2) included in the second poll message. The third electronic device 830 may perform transmission with a first offset number (for example, Tx offset 1) in slot 15 (for example, a sixteenth subslot among 50 subslots) during the time of the third contention phase information (for example, 50 slots) since reception offset configuration information of the second transmission offset number is 1. Since the reception offset configuration information is 1, the third electronic device 830 may perform transmission with an offset number different from the first electronic device 810. After transmitting the third response message, the third electronic device 830 may enter the sleep state for the UWB communication until the third distance measurement cycle 1190 included in the third poll message ends. When the third distance measurement cycle 1190 ends, the third electronic device 830 may activate the UWB communication in order to receive the fourth poll message.

According to various embodiments, when the time of the third contention phase information 1150 ends after the third poll message is transmitted, the first electronic device 810 may enter the sleep mode for the UWB communication during the remaining time 1191 of the third distance measurement cycle 1190. The first electronic device 810 may measure the distance from the external electronic device and calculate AOA information on the basis of the response message received during the time of the third contention phase information 1150. When the remaining time 1191 of the third distance measurement cycle 1190 ends, the first electronic device 810 may activate UWB communication and transmit the fourth poll message. Before entering the sleep mode or after activating the UWB communication, the first electronic device 810 may determine fourth contention phase information or fourth transmission offset information on the basis of the response message.

Figure 12:
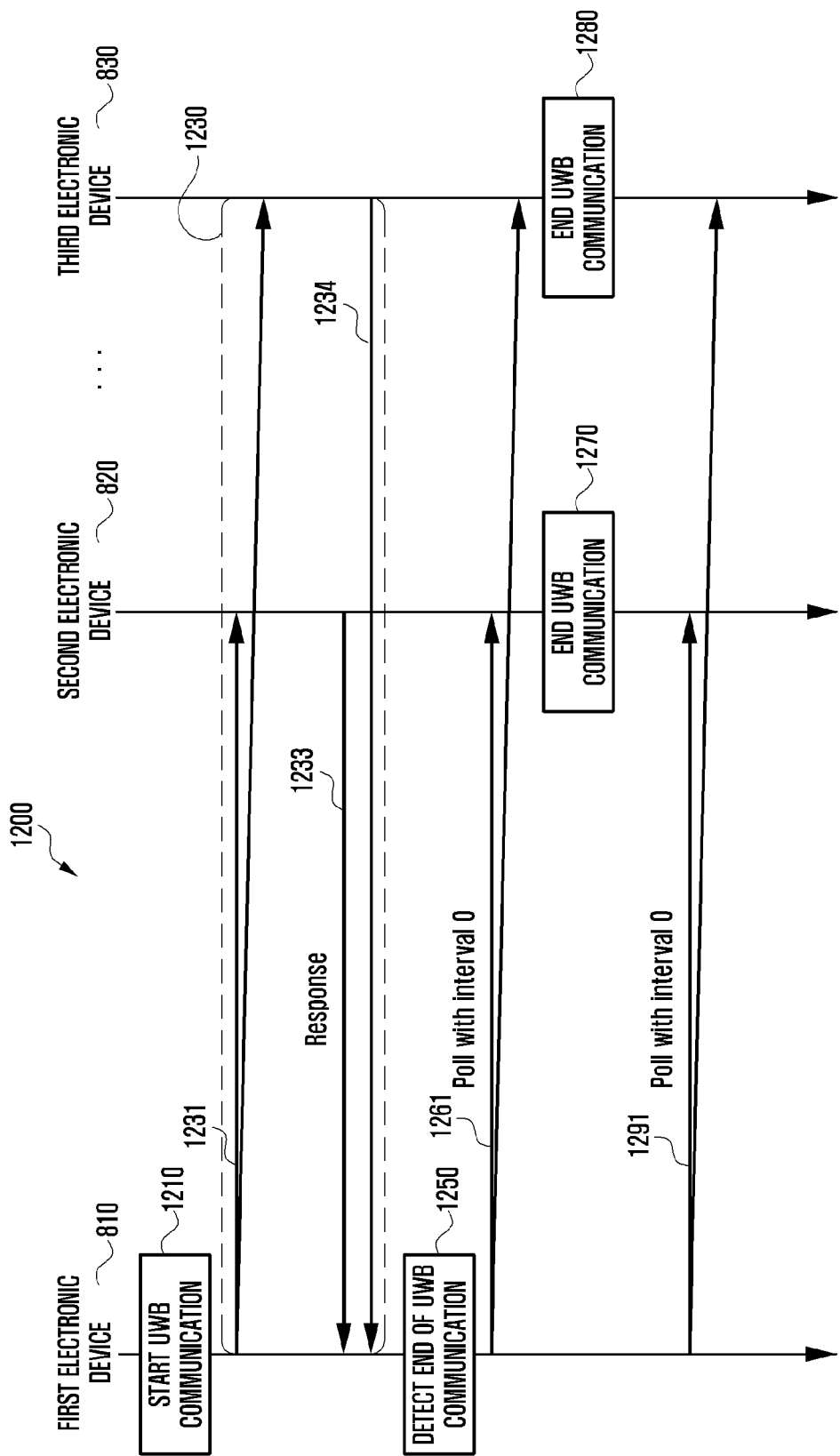
FIG. 12 is a flowchart illustrating a method of ending communication between electronic devices according to various embodiments.

FIG. 12 is a flowchart 1200 illustrating a method of ending communication between electronic devices according to various embodiments.

Referring to FIG. 12, in operation 1210, the first electronic device 810 (for example, the electronic device 101 of FIG. 1) may start UWB communication. The UWB communication may measure the distance (or location) of each electronic device through two-way ranging (hereinafter, referred to as 'TWR') between the first electronic device 810 and a second electronic device 820 (for example, the electronic device 102 of FIG. 1). The first electronic device 810 may start the UWB communication after performing a preparation process for starting the UWB communication with the second electronic device 820.

In operation 1231, the first electronic device 810 may broadcast a first poll message. The first poll message may be transmitted to one or more electronic devices located around the first electronic device 810 in a broadcast manner. For example, the second electronic device 820 may receive the first poll message, and the third electronic device 830 may receive the first poll message. Operation 1231 may mean transmission of the first poll message at the same time, and the reception time of the second electronic device 820 or the third electronic device 830 may be different according to the distance apart from the electronic device 810. Since operation 1231 is the same as or similar to operation 1111 of FIG. 11, a description thereof may be omitted.

In operation 1233, the second electronic device 820 may transmit a first response message. The second electronic device 820 may transmit a first response message on the basis of first contention phase information 1230 included in the first poll message or transmission offset information included in the poll message received before the first poll message. Since operation 1233 is the same as or similar to operation 1113 of FIG. 11, a description thereof may be omitted.

In operation 1234, the third electronic device 830 may transmit the first response message. The third electronic device 830 may transmit a first response message on the basis of first contention phase information 1230 included in the first poll message or transmission offset information included in the poll message received before the first poll message. Since operation 1234 is the same as or similar to operation 1114 of FIG. 11, a description thereof may be omitted.

In operation 1250, the first electronic device 810 may detect the end of UWB communication. The first electronic device 810 may receive a request for ending the UWB communication from the user or may determine the end of UWB communication according to a predetermined condition. For example, the electronic device 810 may start UWB communication for data transmission and, when data transmission is completed, determine to end the UWB communication. In another example, when measurement of the distance from the external electronic device is completed or the time predetermined for distance measurement (for example, first contention phase information 1230) ends, the electronic device 810 may determine to end the UWB communication.

In operation 1261, the first electronic device 810 may broadcast a second poll message. The second poll message is to end the UWB communication, and a distance measurement cycle (for example, an interval) may be configured as 0 therein. In order to end the UWB communication, the first electronic device 810 may broadcast a second poll message configuring the distance measurement cycle (for example, the interval) as 0. For example, the second electronic device 820 may receive the second poll message, and the third electronic device 830 may receive the second poll message. Operation 1261 may mean transmission of the second poll message at the same time, and the reception time of the second electronic device 820 or the third electronic device 830 may be different according to the distance apart from the electronic device 810.

In operation 1270, the second electronic device 820 may end the UWB communication on the basis of the second poll message. In an embodiment, when the distance measurement cycle included in the second poll message is 0, the second electronic device 820 may end the UWB communication. When the poll message is not received a predetermined number of times or more (for example, 5 times or 10 times) as well as the case in which the distance measurement cycle is 0, the second electronic device 820 may end the UWB communication. When the distance measurement cycle included in the second poll message is 0, the second electronic device 820 may stop measuring the distance and remove a distance measurement session through the UWB communication without transmitting the response message in the corresponding distance measurement cycle.

In operation 1280, the third electronic device 830 may end the UWB communication on the basis of the second poll message. In an embodiment, when the distance measurement cycle included in the second poll message is 0, the third electronic device 830 may end the UWB communication. When the distance measurement cycle included in the second poll message is 0, the third electronic device 830 may stop measuring the distance and remove the distance measurement session without transmitting the response message in the corresponding distance measurement cycle.

In operation 1291, the first electronic device 810 may broadcast a third poll message. The first electronic device 810 may transmit the poll message for ending the UWB communication a predetermined number of time or more (for example, 2 times or 3 times) in consideration that the poll message for ending the communication cannot be received.

Figure 13:
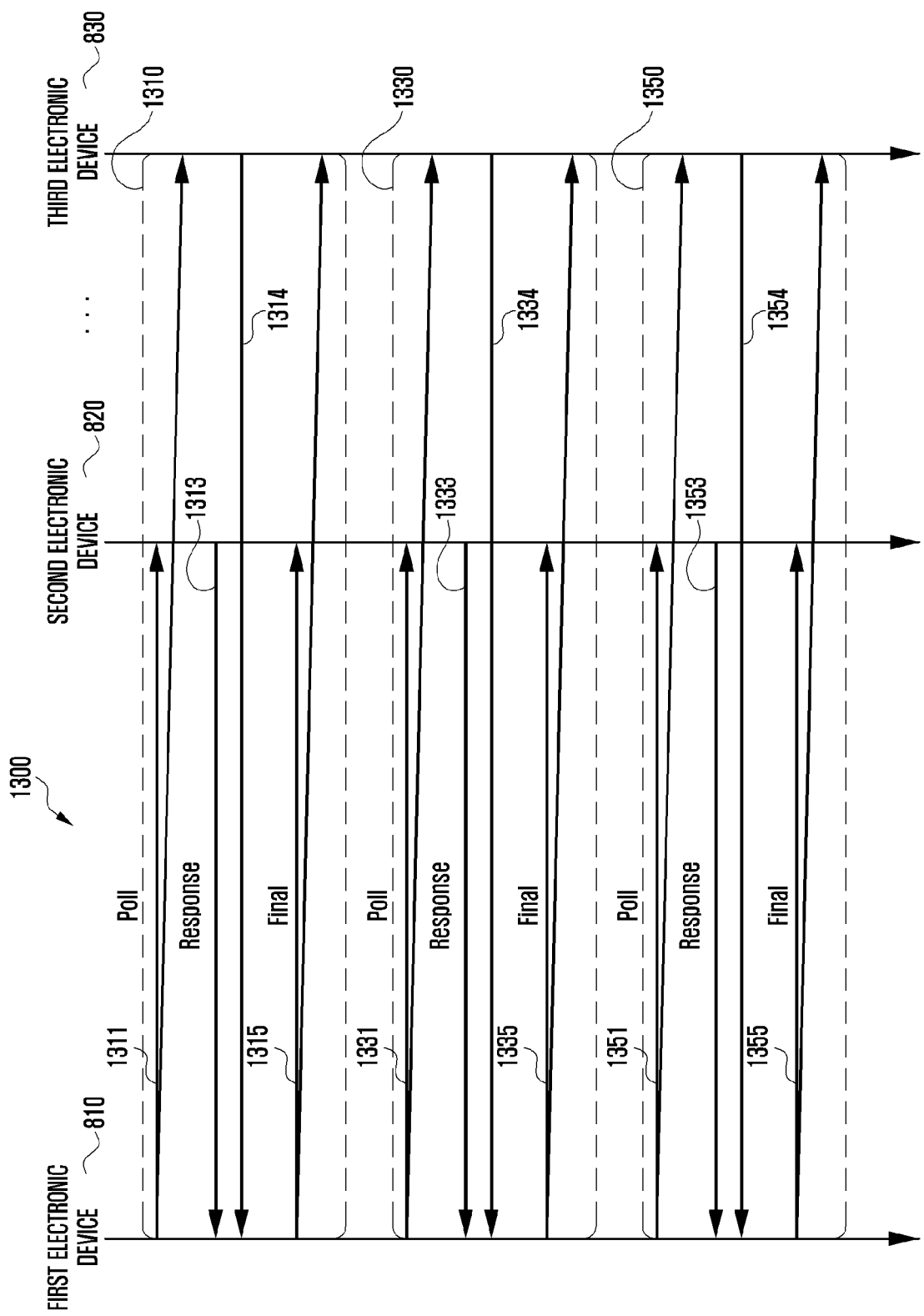
FIG. 13 is a flowchart illustrating a method of performing communication between electronic devices in a DS-TWR scheme according to various embodiments.

FIG. 13 is a flowchart 1300 illustrating a method of performing communication between electronic devices in a DS-TWR scheme according to various embodiments.

Referring to FIG. 13, it is possible to measure the distance between electronic devices in the DS-TWR scheme. In the DS-TWR scheme, the distance may be measured only when a master electronic device transmits a final message.

In operation 1311, the first electronic device 810 may broadcast a first poll message. The first poll message may be transmitted to one or more electronic devices located around the first electronic device 810 in a broadcast manner. For example, the second electronic device 820 may receive the first poll message, and the third electronic device 830 may receive the first poll message. Operation 1311 may mean transmission of the first poll message at the same time, and the reception time of the second electronic device 820 or the third electronic device 830 may be different according to the distance apart from the electronic device 810. Since operation 1311 is the same as or similar to operation 1111 of FIG. 11, a description thereof may be omitted.

In operation 1313, the second electronic device 820 may transmit a first response message. The second electronic device 820 may transmit a first response message on the basis of first contention phase information 1310 included in the first poll message or transmission offset information included in the poll message received before the first poll message. In the DS-TWR scheme, response time information may not be included in the first response message. In an embodiment, when the second electronic device 820 has not received a poll message before the first poll message, the second electronic device may transmit a first response message on the basis of the first poll message.

In operation 1314, the third electronic device 830 may transmit the first response message. The third electronic device 830 may transmit a first response message on the basis of first contention phase information 1310 included in the first poll message or transmission offset information included in the poll message received before the first poll message. In the DS-TWR scheme, response time information may not be included in the first response message. In an embodiment, when the third electronic device 830 has not received a poll message before the first poll message, the third electronic device may transmit a first response message on the basis of the first poll message.

In operation 1315, the first electronic device 810 may broadcast a first final message. The first final message may include response time information for distance measurement. For example, the first final message may include information on time at which the first poll message is transmitted and information on time at which the first response message is received. Alternatively, the first final message may include processing time information from transmission of the first poll message by the first electronic device 810 to reception of the first response message. Although figures illustrate that the first final message is transmitted within the time of the first contention phase information 1310, the first final message may be transmitted in the next slot after the time of the first content phase information 1310 ends. According to various embodiments, the first electronic device 810 may not insert time information for distance measurement into the first final message and separately transmit data including only the time information for distance measurement.

In an embodiment, for example, the second electronic device 820 may receive the first final message and the third electronic device 830 may receive the first final message. Operation 1315 may mean transmission of the first final message at the same time, and reception time of the second electronic device 820 or the third electronic device 830 may vary depending on the distance apart from the electronic device 810. The second electronic device 820 or the third electronic device 830 receiving the first final message may measure the distance from the first electronic device 810. Alternatively, the second electronic device 820 or the third electronic device 830 may receive data including only the time information for distance measurement received from the first final message and measure the distance from the first electronic device 810.

In the DS-TWR scheme, the first electronic device 810 cannot measure the distance from the second electronic device 820 or the third electronic device 830, and thus the second electronic device 820 or the third electronic device 830 may insert the response time information into a second response message transmitted in a second distance measurement cycle and transmit the second response message.

In operation 1331, the first electronic device 810 may broadcast a second poll message. Since operation 1331 is the same as or similar to operation 1111 of FIG. 11, a description thereof may be omitted.

In operation 1333, the second electronic device 820 may transmit a second response message. The second electronic device 820 may transmit the second response message on the basis of second contention phase information 1330 included in the second poll message or first transmission offset information included in the first poll message. The second electronic device 820 may insert response time information into the second response message and transmit the second response message. The response time information may include information on time at which the first poll message is received from the first electronic device 810 and information on time at which the first response message is transmitted. Alternatively, the response time information may include processing time information from reception of the first poll message from the first electronic device 810 to transmission of the first response message.

In operation 1334, the third electronic device 830 may transmit the second response message. The third electronic device 830 may transmit the second response message on the basis of second contention phase information 1330 included in the second poll message or first transmission offset information included in the first poll message. The second electronic device 820 may insert response time information into the second response message and transmit the second response message. The response time information may include information on time at which the first poll message is received from the first electronic device 810 and information on time at which the first response message is transmitted. Alternatively, the response time information may include processing time information from reception of the first poll message from the first electronic device 810 to transmission of the first response message.

In operation 1335, the first electronic device 810 may broadcast a second final message. The second final message may include response time information for distance measurement. For example, the second final message may include information on time at which the second poll message is transmitted and information on time at which the second response message is received. Alternatively, the second final message may include processing time information from transmission of the second poll message by the first electronic device 810 to reception of the second response message.

In operation 1351, the first electronic device 810 may broadcast a third poll message. Since operation 1351 is the same as or similar to operation 1111 of FIG. 11, a description thereof may be omitted.

In operation 1353, the second electronic device 820 may transmit a third response message. The second electronic device 820 may transmit the third response message on the basis of second contention phase information 1350 included in the third poll message or second transmission offset information included in the second poll message. The second electronic device 820 may insert response time information into the third response message and transmit the third response message.

In operation 1354, the third electronic device 830 may transmit the third response message. The third electronic device 830 may transmit the third response message on the basis of third contention phase information 1350 included in the third poll message or second transmission offset information included in the second poll message. The second electronic device 820 may insert response time information into the third response message and transmit the third response message.

In operation 1355, the first electronic device 810 may broadcast a third final message. The third final message may include response time information for distance measurement. For example, the third final message may include information on time at which the third poll message is transmitted and information on time at which the third response message is received. Alternatively, the third final message may include processing time information from transmission of the third poll message by the first electronic device 810 to reception of the third response message.

According to various embodiments, as the size of the final message is larger, the reception performance may further deteriorate. When the size of the final message is larger than or equal to a predetermined size, the final message may be divided into a plurality of messages and transmitted. The final message may be transmitted by additionally allocating slots to the time of the contention phase information. After receiving the first final message, the second electronic device 820 or the third electronic device 830 may transmit a separate message including only the response time information.

Figure 14:
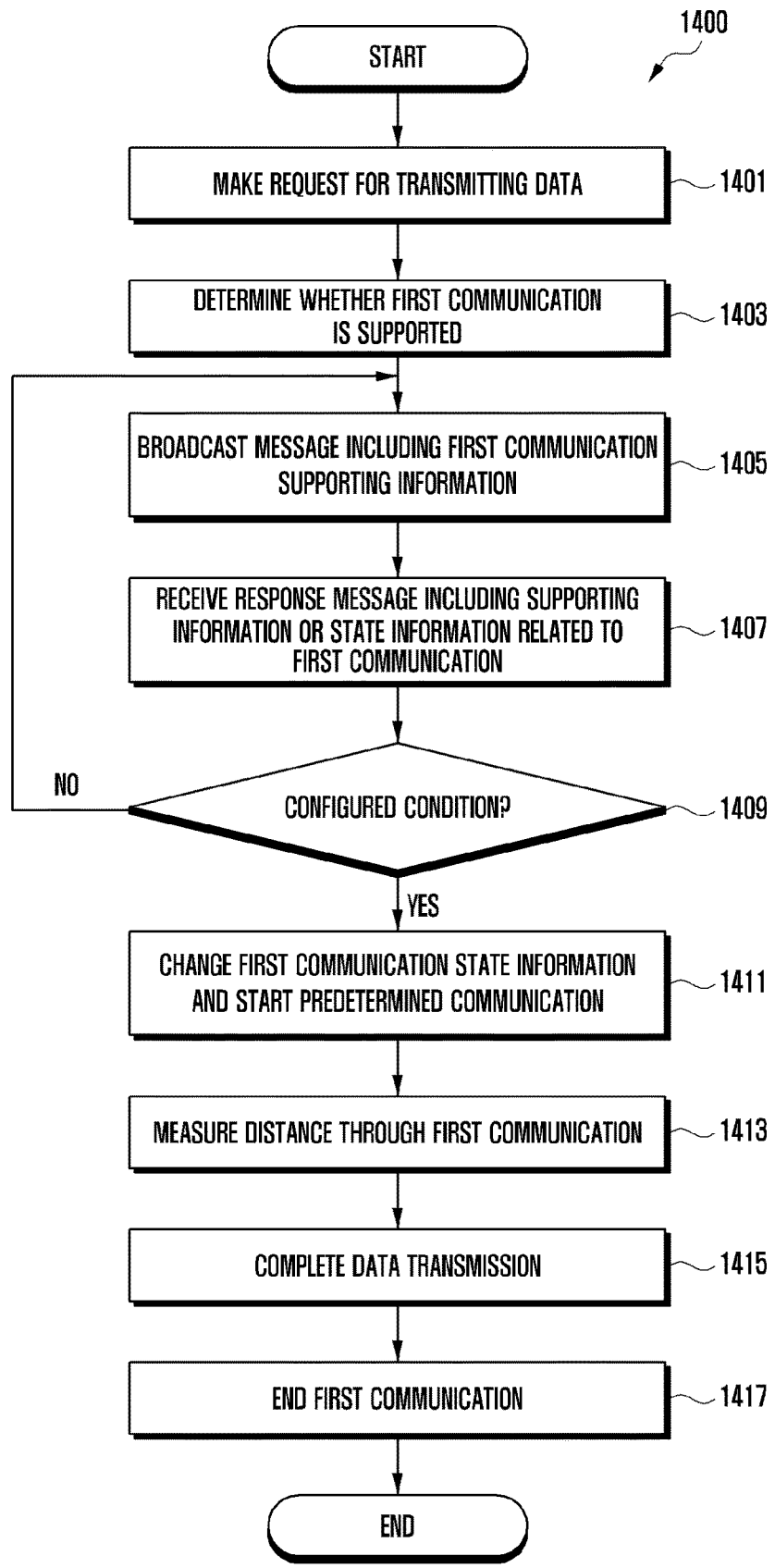
FIG. 14 is a flowchart illustrating a method of activating first communication by an electronic device serving as a master according to various embodiments.

FIG. 14 is a flowchart 1400 illustrating a method of activating first communication by an electronic device serving as a master according to various embodiments.

Referring to FIG. 14, it may be described to help understanding of the disclosure that, when an electronic device (for example, the electronic device 101 of FIG. 1) according to various embodiments serves as a master, an external electronic device (for example, the electronic device 102 or the electronic device 104 of FIG. 1) operates an electronic device serving as a slave.

In operation 1401, a processor (for example, the processor 120 of FIG. 1) of the electronic device 101 may receive a data transmission request. The data transmission request may receive selection of data to be transmitted (for example, content such files, images, or documents) from the user of the electronic device 101 and selection of a transmission button. Alternatively, the data transmission request may be execution of an application related to data transmission and receive selection of data to be transmitted.

In operation 1403, the processor 120 may determine whether first communication is supported. The first communication may be UWB communication. The processor 120 may configure communication supporting information as 1 when the electronic device 101 is UWB communication, and configure communication supporting information as 0 when the electronic device 101 does not support UWB communication.

In operation 1405, the processor 120 may broadcast a message including first communication supporting information. The processor 120 may broadcast the message in communication schemes other than the first communication. For example, the processor 120 may broadcast the message through the BLE module 210. The message is broadcasted, and thus may be transmitted to external electronic devices existing around the electronic device 101. The processor 120 may periodically transmit the message (for example, BLE advertising).

In operation 1407, the processor 120 may receive a response message including supporting information or state information related to first communication from the external electronic device. The communication supporting information may include information on whether the external electronic device transmitting the response message supports UWB communication. Communication supporting information of 1 maybe included in the response message when the external electronic device supports UWB communication, and communication supporting information of 0 may be included when the external electronic device does not support UWB communication. The communication state information may include information on whether UWB communication is ready. Communication state information of 1 may be included in the response message when the external electronic device is ready to perform UWB communication, and communication state information of 0 may be included when the external electronic device support UWB communication but is not ready to perform UWB communication. For example, the case in which UWB communication is not ready may include a state in which UWB communication is deactivated or a state in which UWB communication cannot be used with the electronic device (for example, UWB communication is temporarily unavailable or the signal strength is low).

In operation 1409, the processor 120 may determine whether the response message corresponds to a configured condition. The configured condition may be the case in which both the communication supporting information and the communication state information are included as 1. The processor 120 may perform operation 1411 when the response message corresponding to the configured condition, and return to operation 1405 when the response message does not correspond to the configured condition. When the processor 120 returns to operation 1405, the processor 120 may prepare UWB communication with the external electronic device by performing operation 1405 to operation 1409. According to an embodiment, when the processor 120 does not receive a message corresponding to the configured condition from the external electronic device for a predetermined time, the processor may end the use of first communication.

The electronic device 101 may detect whether there is an external electronic device around the electronic device through second communication. However, it may be difficult to determine which electronic device to which the electronic device 101 will transmit data is. An electronic device of the already registered user or an electronic device of a friend may be displayed, but when data is simply transmitted to a person who the user has just first met, it may be not easy to specify the other party only with information on the electronic device. In an embodiment, the electronic device 101 may determine an external electronic device by using the distance and AoA value obtained through UWB communication. For example, the electronic device 101 may estimate a device transmitting and receiving data by using the distance and AoA value obtained through UWB communication. In another embodiment, the electronic device 101 may perform UWB communication with the external electronic device through low energy wireless communication (for example, BLE). For example, the external electronic device found through the low energy wireless communication (for example, BLE) may activate UWB communication on the basis of data transmitted through the low energy wireless communication and perform UWB communication with the electronic device 101.

The electronic device 101 to transmit data such as files or messages may search for external electronic devices located around the electronic device through low energy wireless communication before performing the UWB communication with the external electronic devices located around the electronic device 101. In an embodiment, the electronic device 101 may search for the external electronic device through low energy wireless communication and exchange information for UWB communication with the found external electronic device, so as to further reduce than immediately performing the UWB communication.

In operation 1411, the processor 120 may change first communication state information and start first communication. The processor 120 may change the communication state information to 1. According to various embodiments, the processor 120 may configure the first communication state information as 0 and transmit a message in operation 1405. When the external electronic device is ready to perform UWB communication, the processor 120 may change the communication state information from 0 to 1. Beginning of the first communication may mean activating (or turning on) the RX module of the UWB module 220. The processor 120 may start the first communication through the UWB module 220 rather than the BLE module 210 in operation 1411. In operation 1413, the processor 120 may measure the distance through the first communication. For example, the processor 120 may transmit a poll message to at least one external electronic device existing around the electronic device 101 and receive a response message for the poll message from at least one external electronic device, so as to measure the distance from the at least one external electronic device. Since operation 1413 is a detailed description through FIG. 4, the detailed description thereof may be omitted.

In operation 1415, the processor 120 may complete data transmission. The completion of data transmission may mean a state in which all data which the user of the electronic device 101 desires to transmit are transmitted.

In operation 1417, the processor 120 may end the first communication. The processor 120 may end the UWB communication by deactivating (or turning off) the RX module of the UWB module 220.

Figure 15:
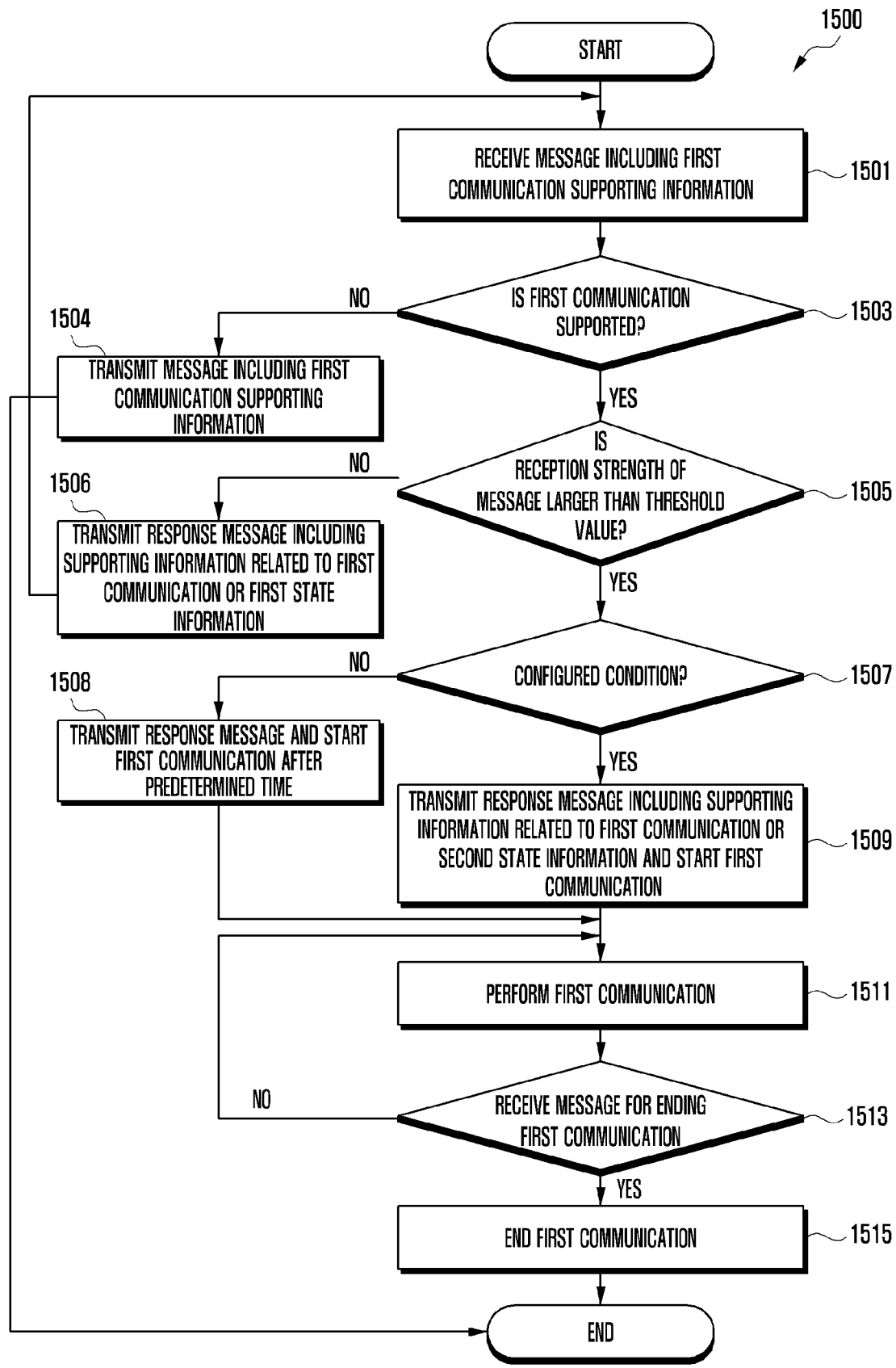
FIG. 15 is a flowchart illustrating a method of activating first communication by an electronic device serving as a slave according to various embodiments.

FIG. 15 is a flowchart 1500 illustrating a method of activating first communication by an electronic device serving as a slave according to various embodiments.

Referring to FIG. 15, it may be described to help understanding of the disclosure that, when an electronic device (for example, the electronic device 101 of FIG. 1) according to various embodiments serves as a slave, an external electronic device (for example, the electronic device 102 or the electronic device 104 of FIG. 1) serves as a master.

In operation 1501, a processor (for example, the processor 120 of FIG. 1) of the electronic device 101 may receive a message including first communication (for example, UWB) supporting information. For example, the processor 120 may receive a message in which first communication (for example, UWB) supporting information is configured as 0 or 1 from the external electronic device. The external electronic device to communicate with the electronic device through the first communication (for example, UWB) may broadcast the message in which the communication supporting information is configured as 1.

In operation 1503, the processor 120 may determine whether first communication is supported. The first communication may be UWB communication. The processor 120 may perform operation 1505 when the electronic device 101 supports UWB communication, and may perform operation 1504 when the electronic device 101 does not support UWB communication.

When the electronic device 101 does not support UWB communication, the processor 120 may transmit a message including first communication supporting information in operation 1504. For example, when the electronic device 101 does not support UWB communication, the processor 120 may configure the communication supporting information as 0 and transmit the message. When the electronic device 101 does not support UWB communication, the processor 120 cannot perform the UWB communication and thus end the operation after operation 1504.

When the electronic device 101 supports UWB communication, the processor 120 may determine whether the reception strength of the message (received signal strength indication (RSSI)) is larger than a threshold value in operation 1505. When the reception strength is low, the processor 120 may determine that the external electronic device transmitting the message is located at a long distance and determine that the external electronic device is not suitable for measurement of the distance from the external electronic device. The processor 120 may perform operation 1507 when the reception strength of the message is larger than the threshold value, and perform operation 1506 when the reception strength of the message is not larger than the threshold value.

When reception strength of the message is not larger than the threshold value, the processor 120 may transmit a response message including supporting information related to first communication or first state information in operation 1506. For example, the response message may include communication supporting information configured as 1 and communication state information configured as first state information (for example, 0). The response message may include information indicating that the electronic device 101 supports UWB communication but the reception strength of the message is low and thus the communication state information is not good. The external electronic device receiving the response message indicating that the reception strength of the message is low and thus the communication state information is not good may inform the user that the communication state information is not good. The user of the external electronic device may move the location (or distance) of the external electronic device according to the informing, thereby making the reception strength of the message measured by the electronic device 101 larger than the threshold value. The electronic device 101 transmitting the response message in operation 1506 may wait for receiving an additional message from the external electronic device in operation 1501.

When the reception strength of the message is larger than the threshold value, the processor 120 may determine whether the message corresponds to a configured condition in operation 1507. The configured condition may be the case in which both the communication supporting information and the communication state information included in the message are 1. The processor 120 may perform operation 1509 when the message corresponds to the configured condition, and perform operation 1508 when the message does not correspond to the configured condition.

When the message does not correspond to the configured condition, the processor 120 may transmit a response message to the external electronic device and start first communication after a predetermined time in operation 1508. In an embodiment, the case in which the message does not correspond to the configured condition may include the case in which the communication supporting information configured in the message is 1 but the communication state information is 0. When the communication supporting information included in the message is 1 and the communication state information is 0, if a predetermined time passes, the external electronic device changes the communication state information to 1, and thus the processor 120 may configure the communication supporting information as 1 and transmit a response message in which the communication state information is configured as second state information (for example, 1). The response message includes information indicating that the electronic device 101 supports UWB communication and the electronic device 101 is completely ready to perform UWB communication. The processor 120 may start first communication after a predetermined time (for example, 3 seconds or 5 seconds) in consideration of a UWB communication preparation time of the external electronic device (for example, a time during which the external electronic device changes the communication state information to 0). Beginning of the first communication may mean activating (or turning on) the RX module of the UWB module 220. The processor 120 may start the first communication through the UWB module 220 rather than the BLE module 210 in operation 1511.

When the message corresponds to the configured condition, the processor 120 may transmit a response message including supporting information related to first communication or second state information and start the first communication in operation 1509. When the external electronic device is ready to perform UWB communication, the processor 120 may change the communication state information from 0 to 1. The case in which the message corresponds to the configured condition is the case in which both the communication supporting information and the communication state information configured in the message are 1, and may mean that the external electronic device is also ready to perform UWB communication. The processor 120 may transmit the response message and start UWB communication at the same time.

In operation 1511, the processor 120 may perform the first communication with the external electronic device. For example, the processor 120 may receive a poll message from the external electronic device and transmit a response message for the poll message. Since operation 1511 is a detailed description through FIG. 4, the detailed description thereof may be omitted.

In operation 1513, the processor 120 may determine whether a message for ending the first communication is received. The message for ending the first communication may be a poll message in which the distance measurement cycle is configured as 0. The processor 120 may perform operation 1515 when the message for ending the first communication is received, and may return to operation 1511 when the message for ending the first communication is not received. When the message for ending the first communication is not received, the processor 120 may return to operation 1511 and perform the first communication with the external electronic device.

When the message for ending the first communication, the processor 120 may end the first communication in operation 1515. The processor 120 may end the UWB communication by deactivating (or turning off) the RX module of the UWB module 220.

Figure 16:
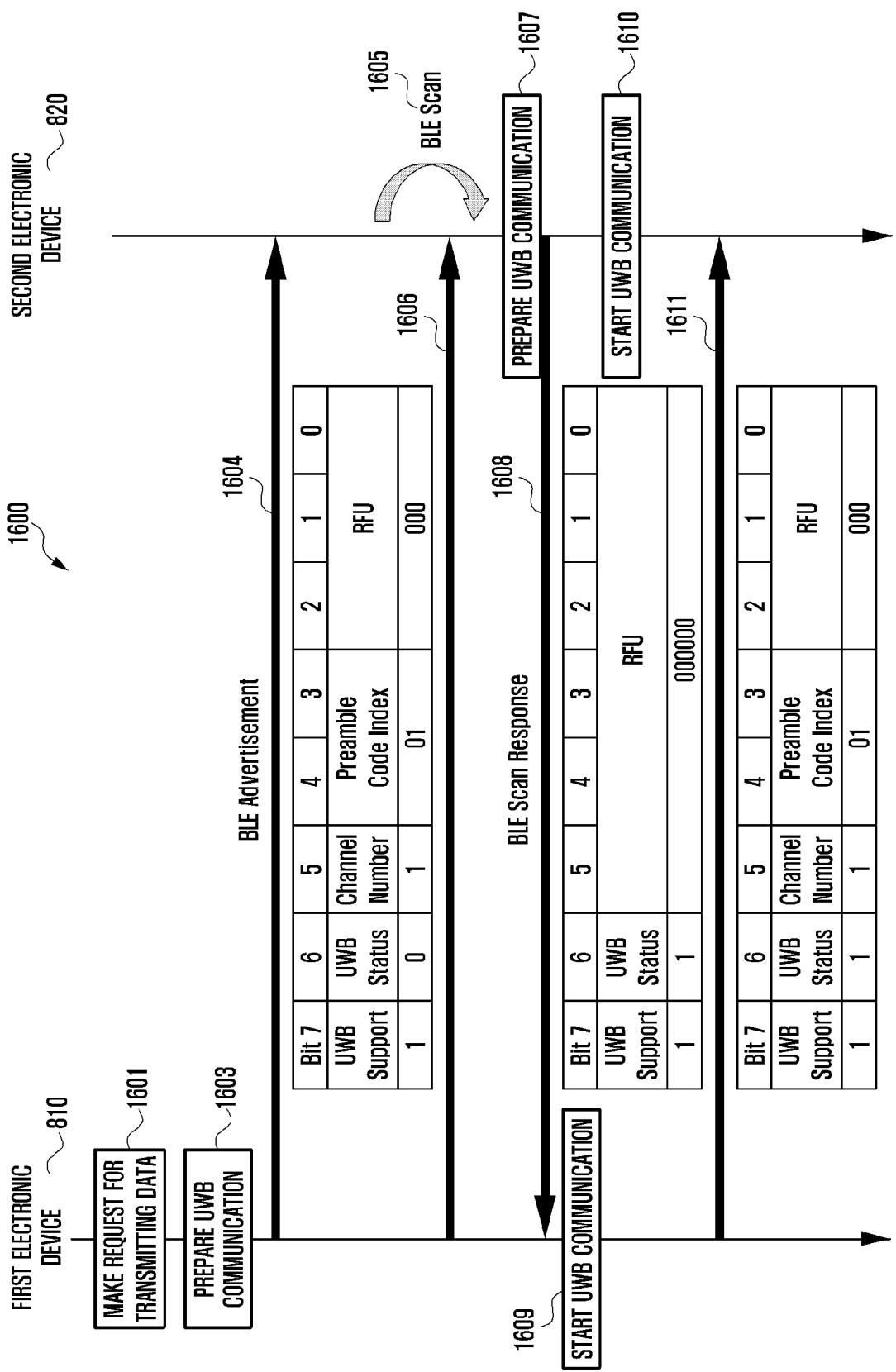
FIG. 16 is a flowchart illustrating a method of activating first communication between electronic devices according to various embodiments.

FIG. 16 is a flowchart 1600 illustrating a method of activating first communication between electronic devices according to various embodiments.

Referring to FIG. 16, in operation 1601, the first electronic device 810 may make a request for transmitting data. The data transmission request may receive selection of data to be transmitted (for example, content such files, images, or documents) from the user of the electronic device 101 and selection of a transmission button. Alternatively, the data transmission request may be execution of an application related to data transmission and receive selection of data to be transmitted.

In operation 1603, the first electronic device 810 may prepare UWB communication. Operation 1603 may mean determination about whether the first electronic device 810 supports UWB communication.

In operation 1604, the first electronic device 810 may broadcast a message (for example, BLE advertising) including first communication supporting information. The message may be configured by 1 byte and may include at least one of communication supporting information (for example, bit 7), communication state information (for example, bit 6), channel information (for example, 5), a preamble code index (for example, bits 4 to 3), or RFU (for example, bits 2 to 0). When the electronic device 101 supports UWB communication, the communication supporting information may be configured as 1 and the communication state information may be configured as 0 in the message. The first electronic device 810 may broadcast the message through the BLE module 210.

In operation 1605, the second electronic device 820 may scan the message. The second electronic device 820 may scan the message through the BLE module.

In operation 1606, the first electronic device 810 may broadcast a message (for example, BLE advertising) including first communication supporting information. The first electronic device 810 may periodically broadcast the same message as the message transmitted in operation 1604.

In operation 1607, the second electronic device 820 may prepare UWB communication. Operation 1607 may mean that the second electronic device 820 scans the message transmitted in operation 1604 or operation 1606 and determine whether UWB communication is supported. According to an embodiment, the second electronic device 820 may perform operation 1503 to operation 1507 of FIG. 15.

In operation 1608, the second electronic device 820 may transmit a response message (for example, BLE scan response) including first communication supporting information. The second electronic device 820 may transmit a response message including communication supporting information or communication state information. In the response message transmitted in operation 1608, both the communication supporting information and the communication state information may be configured as 1.

In operation 1609, the first electronic device 810 may start UWB communication. Since both the communication supporting information and the communication state information included in the response message received from the second electronic device 820 are 1, the first electronic device 810 may change the communication state information to 1 and activate (or turn on) the RX module of the UWB module 220.

In operation 1610, the second electronic device 820 may start UWB communication. Since the communication state information of the UWB module 220 of the first electronic device 810 in the message received from the first electronic device 810 is 0, the second electronic device 820 may start UWB communication after a predetermined time from transmission of the response message (for example, BLE scan response). According to an embodiment, the second electronic device 820 may transmit the response message (for example, BLE scan response) and start the UWB communication substantially at the same time.

In operation 1611, the first electronic device 810 may transmit a communication preparation completion message. The first electronic device 810 may transmit a message in which both the communication supporting information and the communication state information are 1.

A method of operating an electronic device (for example, the electronic device 101 of FIG. 1) may include: an operation of determining contention phase information or transmission offset information, which is related to first communication; an operation of broadcasting a first message including the contention phase information or the transmission offset information through at least one communication module (for example, the communication module 190 of FIG. 1) of the electronic device; an operation of receiving at least one second message from at least one external electronic device through the at least one communication module in response to the first message; and an operation of changing the contention phase information or the transmission offset information, based on the at least one second message.

Various embodiments of the disclosure disclosed in the specifications and drawings present specific examples for ease of description of the technical content of the disclosure and to help understanding of the disclosure, but are not intended to limit the scope of the disclosure. Therefore, it should be construed that not only the embodiments disclosed herein but also all modifications or modified forms capable of being derived on the basis of the technical idea of the disclosure are included in the scope of the disclosure.

The invention claimed is:

1. An electronic device comprising:
at least one communication module;
memory storing instructions; and
a processor operatively connected to the at least one communication module and the memory,
wherein the instructions that, when executed by the processor individually or collectively, cause the electronic device to:
determine contention phase time or transmission offset information, which is related to ultra-wide band (UWB) communication,
broadcast a poll message including the contention phase time or the transmission offset information through the at least one communication module,
activate a RX module of a UWB module of the least one communication module and wait for receiving at least one response message during the contention phase time after broadcasting the poll message,
receive the least one response message from at least one external electronic device through the at least one communication module in response to the poll message,
measure a distance from the at least one external electronic device which transmits the at least one response message to the electronic device, based on the poll message and the at least one response message,
determine whether the contention phase time expires,
when the contention phase time is expired, control the RX module of the UWB module to be in an off state until a next poll message is transmitted, and
change the contention phase time or the transmission offset information according to a number of the at least one external electronic device which transmits the at least one response message.

2. The electronic device of claim 1, wherein contention phase time is configured to be shorter than a time of a cycle in which the distance from the at least one external electronic device to the electronic device is measured through the UWB communication.

3. The electronic device of claim 2, wherein the instructions, when executed by the processor individually or collectively, cause the electronic device to determine reception success or reception failure by analyzing the at least one response message, and
calculate a total number of the at least one response message including at least one of a total number of response messages containing the reception success of the at least one response message, a total number of response messages containing the reception failure of the at least one response message, or a total number of response messages increased by the total number of response messages containing the reception failure.

4. The electronic device of claim 2, wherein, when the contention phase time is increased, the instructions, when executed by the processor individually or collectively, cause the electronic device to reflect the increased contention phase time in a third message including the changed contention phase time or the changed transmission offset information and,
when the contention phase time is decreased and it is determined that the contention phase time calculated for a predetermined number of times is successively decreased, the instructions, when executed by the processor individually or collectively, cause the electronic device to reflect the decreased contention phase time in a fourth message after the predetermined number of times.

5. The electronic device of claim 1,
the instructions, when executed by the processor individually or collectively, cause the electronic device to determine whether a time for performing the UWB communication ends during the sleep state for the UWB communication, and
activate the UWB communication when the time for performing the UWB communication ends.

6. The electronic device of claim 1, wherein the transmission offset information includes at least one of a total number of transmission offsets of a next distance measurement cycle, a transmission offset number of the next distance measurement cycle, or reception offset configuration information of the next distance measurement cycle.

7. The electronic device of claim 6, wherein the instructions, when executed by the processor individually or collectively, cause the electronic device to configure the total number of transmission offsets of the next distance measurement cycle, based on a payload of the poll message.

8. The electronic device of claim 6, wherein the transmission offset number of the next distance measurement cycle is an offset number used when the electronic device transmits a third message including the changed contention phase information or the changed transmission offset information.

9. The electronic device of claim 8, wherein the reception offset configuration information of the next distance measurement cycle is information for configuring whether to use an offset number equal to the transmission offset number or randomly use an offset number different from the transmission offset number when the at least one external electronic device, which receives the third message, transmits a response message for the third message.

10. The electronic device of claim 1, wherein the instructions, when executed by the processor individually or collectively, cause the electronic device to transmit a fifth message including supporting information related to the UWB communication through second communication different from the UWB communication, receive a response message including the supporting information or state information related to the UWB communication from at least one external electronic device, which receives the fifth message, and start the UWB communication when the response message corresponds to a predetermined condition.

11. The electronic device of claim 1, wherein the poll message further includes response control information for an information request for measuring angle of arrival (AoA) information with respect to the at least one external electronic device, and the instructions, when executed by the processor individually or collectively, cause the electronic device to calculate the AoA information with respect to the at least one external electronic device, based on additional response information included in the at least one response message according to the response control information.

12. A method of operating an electronic device, the method comprising:

determining contention phase time or transmission offset information, which is related to ultra-wide band (UWB) communication;

broadcasting a poll message including the contention phase time or the transmission offset information through at least one communication module of the electronic device;

activating a RX module of a UWB module of the at least one communication module and waiting for receiving at least one response message during the contention phase time after broadcasting the poll message;

receiving the at least one response message from at least one external electronic device through the at least one communication module in response to the poll message;

measuring a distance from the at least one external electronic device which transmit the at least one response message to the electronic device, based on the poll message and the at least one response message;

determining whether the contention phase time expires;

when the contention phase time is expired, controlling the RX module of the UWB module to be in an off state until a next poll message is transmitted; and changing the contention phase time or the transmission offset information, according to a number of the at least one external electronic devices which transmit the at least one response message.

13. The method of claim 12, wherein contention phase time is configured to be shorter than a time of a cycle in which a distance from the at least one external electronic device to the electronic device is measured through the UWB communication.

14. A method of operating an electronic device, the method comprising:

determining whether a predetermined condition that is a case in which the electronic device supports an ultra-wide band (UWB) communication and is ready to perform the UWB communication;

when the predetermined condition satisfies, transmitting a message including supporting information related to the UWB communication and state information that the electronic device is ready to perform the UWB communication to an external electronic device through Bluetooth low energy (BLE);

starting the UWB communication using a UWB module of at least one communication module of the electronic device;

receive a poll message including contention phase time or transmission offset information, which is related to the UWB communication from the external electronic device;

transmitting a response message based on the contention phase time or the transmission offset information; and controlling a RX module of the UWB module to be in an off state until receiving a next poll message after transmitting the response message.

15. The method of claim 14, further comprising:

based on determining that the reception strength is not larger than the threshold value, transmitting the message indicating that the electronic device supports the UWB communication but the reception strength of the message is not larger than the threshold value and waiting for receiving an additional message.

16. The method of claim 14, further comprising:

based on determining that the message does not correspond to the predetermined condition, transmitting the message indicating that the electronic device supports the UWB communication and is not ready to perform the UWB communication and starting the UWB communication after a predetermined time, wherein first state information indicates that electronic device is not ready to perform the first communication.

* * * * *